US012735014B2

(12) United States Patent
Riediger-Janisch

(10) Patent No.: US 12,735,014 B2
(45) Date of Patent: Sep. 15, 2026

(54) BRAKE PRESSURE MODULATOR, PNEUMATIC BRAKE SYSTEM AND VEHICLE

(71) Applicant: ZF CV Systems Europe BV, Brussels (BE)

(72) Inventor: Karl-Heinz Riediger-Janisch, Hannover (DE)

(73) Assignee: ZF CV Systems Europe BV, Brussels (BE)

( * ) Notice: Subject to any disclaimer, the term of this patent is extended or adjusted under 35 U.S.C. 154(b) by 504 days.

(21) Appl. No.: 18/031,655

(22) PCT Filed: Oct. 14, 2020

(86) PCT No.: PCT/EP2020/078838
§ 371 (c)(1),
(2) Date: Apr. 13, 2023

(87) PCT Pub. No.: WO2022/078584
PCT Pub. Date: Apr. 21, 2022

(65) Prior Publication Data
US 2023/0391304 A1 Dec. 7, 2023

(51) Int. Cl.
*B60T 13/68* (2006.01)
*B60T 8/32* (2006.01)
(Continued)

(52) U.S. Cl.
CPC ............ *B60T 13/683* (2013.01); *B60T 8/327* (2013.01); *B60T 13/26* (2013.01); *B60T 17/221* (2013.01)

(58) Field of Classification Search
CPC . B60T 8/38; B60T 8/342; B60T 8/327; B60T 13/26; B60T 13/683; B60T 17/221;
(Continued)

(56) References Cited

U.S. PATENT DOCUMENTS 2,168,748 A * 8/1939 Leukhardt ............. B60T 13/683 303/29
5,718,486 A 2/1998 Vollmer et al.
(Continued)

FOREIGN PATENT DOCUMENTS

CN 108162948 A * 6/2018 ............. B60T 15/04
DE 102009009811 A1 9/2010
(Continued)

OTHER PUBLICATIONS

CN-108162948-A (Year: 2018).*
(Continued)

*Primary Examiner* — Thomas J Williams
(74) *Attorney, Agent, or Firm* — Dickinson Wright PLLC

(57) ABSTRACT

A brake pressure modulator (110, 110*a*, 110*b*, 110*c*, 106) includes: a relay valve (202); a first valve sub-unit (204) that receives a primary control pressure from primary source (II) intended for opening the relay valve (202); and a second valve unit (206) that receives a secondary control pressure from a secondary source ('BST') and at least part of the primary control pressure. The second valve unit (206) is a pneumatically controlled valve (206D, 206A, 206B, 206C) having a valve casing (304) including a pressurized guiding sleeve (304.4) providing a valve chamber (305) that axially guides a spool (320) adapted for mere pneumatic actuation, and a coil casing (304.5) providing a coil chamber (306) next to the pressurized guiding sleeve (304.4). The valve chamber (305) is free of a spring (321) and the coil chamber (306) is free of a solenoid (311), such that the spool (320) is actuable pneumatically only.

20 Claims, 11 Drawing Sheets

(51) Int. Cl.
*B60T 13/26* (2006.01)
*B60T 17/22* (2006.01)

(58) Field of Classification Search
CPC ...... B60T 15/203; B60T 15/206; B60T 15/20; B60T 11/28; B60T 15/18
See application file for complete search history.

(56) References Cited

U.S. PATENT DOCUMENTS

| | | | | |
|---|---|---|---|---|
| 9,796,365 | B2 * | 10/2017 | Couppee | B60T 8/4818 |
| 2006/0017317 | A1 | 1/2006 | Howell et al. | |
| 2006/0284479 | A1 | 12/2006 | Hoover et al. | |
| 2009/0114865 | A1 | 5/2009 | Homann et al. | |
| 2017/0210365 | A1 | 7/2017 | Lülfing et al. | |
| 2017/0217412 | A1 * | 8/2017 | Knoke | B60T 8/3675 |
| 2018/0273004 | A1 * | 9/2018 | Niglas | B60T 13/662 |
| 2019/0084542 | A1 * | 3/2019 | Eckert | B60T 8/36 |
| 2019/0263371 | A1 * | 8/2019 | Goers | B60T 15/027 |
| 2023/0391304 | A1 * | 12/2023 | Riediger-Janisch | B60T 13/683 |

FOREIGN PATENT DOCUMENTS

| | | | |
|---|---|---|---|
| DE | 102018122193 | A1 | 3/2020 |
| JP | 5-42029 | U * | 6/1993 |
| WO | 2006122374 | A1 | 11/2006 |

OTHER PUBLICATIONS

European Patent Office, Rijswijk, Netherlands, International Search Report of International Application No. PCT/EP2020/078838, Mailed Nov. 30, 2020, 3 pages.

* cited by examiner

BRAKE PRESSURE MODULATOR, PNEUMATIC BRAKE SYSTEM AND VEHICLE

FIELD

The present disclosure relates to a brake pressure modulator for a pneumatic brake system and/or for a vehicle. The present disclosure also relates to a respective pneumatic brake system and/or a vehicle.

Such kind of brake pressure modulator comprises a relay valve for controlling a supply of pressurized air from a primary source to at least one brake actuator; a first valve sub-unit configured to be electronically actuated, wherein the first valve sub-unit is configured to receive a primary control pressure from the primary source intended for opening the relay valve; and a second valve unit configured to at least receive a secondary control pressure from a secondary source and at least part of the primary control pressure from the primary source and to transmit either the primary control pressure or the secondary control pressure to the relay valve, wherein when the secondary control pressure is transmitted to the relay valve, the primary control pressure from the primary source is disconnected, and/or when the primary control pressure is transmitted to the relay valve, the secondary control pressure from the secondary source is disconnected.

More particularly, the present disclosure relates to the brake pressure modulator operable by a pneumatic force that operates as, for example, a multi-relay valve for wheel end actuators associated with a pneumatic brake system.

For instance, the brake pressure modulator of the present disclosure can be a pneumatic brake pressure modulator (PCV unit section, pressure control valve unit section) that is provided at either a front and/or auxiliary axle of the vehicle (AVP, axle valve package) or associated with applying control pressure for the trailer brake system.

BACKGROUND

Electronic brake systems allow precisely controllable and rapid braking of a vehicle. In this context, the output signal of a brake signal transmitter, which depends on a deceleration demand of the driver, is passed to a control unit. In the control unit, the output signal of the brake signal transmitter can be modified additionally by driving safety systems, such as an antilock system, a traction control system or a system for electronic stability control. From this, the control unit produces control signals, which are passed to "brake pressure modulators", which control the supply of a pressure medium, generally compressed air in the case of utility vehicles, to the individual braking devices or brake cylinders in a manner specific to the wheel or axle-wise by way of electromagnetically actuable valve arrangements.

In the event that said control unit fails, e.g. because the power supply thereof is interrupted, the electronic brake system generally has a redundant device associated with the service brake or the pressure control system in order to be able to bring the vehicle safely to a halt, even in this operating situation, by brake actuation. More particularly, the redundant device comprises a modulator (PCV, pressure control valve) operable merely by a pneumatic force; this is without the need and/or independent of an electronic control.

However, the use of spatially and structurally separate brake pressure modulators for the individual pressure control circuits gives rise to a relatively large installation space requirement and manufacturing expense for air brake systems of the type described on light to medium-weight utility vehicles. Given this background DE 10 2009 009 811 A1 discloses a dual-circuit brake pressure modulator for an electronic brake system of a vehicle.

Brake pressure modulators for controlling the pressurized airflow to the brake actuators associated with either a front axle or to the brake actuators associated with the trailer have been known in the art.

For instance, US patent publication US 2017/210365 further discloses a conventional brake pressure modulator provided for the purpose of the controlling the flow of the pressurized flowed to the brake actuators. This conventional brake pressure modulators discloses use of a number of 2/2 solenoid control valves to manage the supply of the pressurized air from a brake signal transmitter to open or close one or more relay valves.

One such conventional brake pressure modulator 400 is also shown in FIG. 4 of the present application. This figure has also been clearly demarcated as 'prior art' in the drawings accompanying the present application. While the general functioning of brake pressure modulator 400 will be derivable to the person skilled in the art of the vehicle brake systems and from the above cited US patent publication US 2017/210365, it is nevertheless shortly (to the extent necessary) explained herewith.

As can be derived from FIG. 4, in order for service brake pressure inlet 410 to be connected with service brake pressure outlet 412 for pressure from reservoir II, a relay valve 402 should to be activated. In accordance with the conventional brake pressure modulator 400, a pneumatic pressure is applied for actuating relay valve 402 in order to selectively enable or disable such a connection between inlet 410 and outlet 412. This control pressure is derived from control pressure inlet 408 receiving pressurized fluid from a reservoir via brake signal transmitter (BST). As can also be derived from FIG. 4, the activation of relay valve 402 is however dependent on receiving the control pressure supply from e.g., a first valve unit 404 and/or a second valve unit 406. Based on the activation states of first and second valve units 404 and 406, the pressurized air is supplied to relay valve 402.

It is noted that there are also default positions for first and second valve units 404 and 406 in which the pressurized air is supplied to relay valve 402 almost one of the two valve units 404 and 406 as safety precaution. In other words, should the electronic control of valve units 404 and 406 not work, they retain default positions, which will still enable the pressurized air supply for actuating relay valve 402. The default positions of each of 2/2 solenoid valves provided in first and second valve units 404 and 406 will guarantee that the required connection between inlet 410 an outlet 412 is established so that during emergency brake application scenarios, when the driver presses the brake pedal (not shown in FIG. 4), the control pressure is still supplied to relay valve 402 to be activated. Such solutions may be referred to as safety braking solutions and may for instance be sometimes stipulated by regulations.

For instance, UN-ECE Reg. No. 13, in the paragraph 5.2.1.18.3. provides one such requirement for trailer brakes in the situations, for instance, when an electric line is found to be defective.

It follows from the above that valve units 404 and 406 however can only be electronically actuated. Therefore, if valve units 404 and 406 require changing of positions from a 'default' position, solenoids of the respective valve units are indispensable. Furthermore, this requires additional wiring and related provisions within conventional brake pressure modulator 400. Needless to say, this has direct effect on the cost of the product due to additional manufacturing and constructional costs that using electronically controlled solenoids entail, but at the same time complying with the safety requirements of the regulations.

FIG. 5 shows a cross-sectional view of the conventional brake pressure modulator 400 where the location of valves 406*c*, 404*a* and 404*b* is shown with valve units 404 and 406 as described before. Furthermore, inlets 408, 410, of modulator can also be located. However, what is most important is location of valve 406*c*. Valve 406*c* hereinafter is also referred to as an electronically actuable pressure control valve.

As can be noticed, three electronically actuable valves 404*a*, 404*b* and 406*c* are placed in parallel positions within a modulator housing 502 of brake pressure modulator 400. As mentioned above, providing spatial allocation for three valves 404*a*, 404*b* and 406*c* arranged in parallel to each other and each of them being solenoid actuated may not be cost-effective.

It follows from the above, one of the cost effective solutions is, for instance, to use a mechanically operable valve instead of solenoid valves, which can be found in e.g., the German application DE 10 2018 122 193 A1 filed also by the Applicant of the present application. However, one of the challenges is the implementation of such an idea is the design constraints involved within the brake modulator when the mechanically operable valve is utilized and at the same time to achieve same function of the electronically operated valves. It is one of the objectives to reduce to the costs on wiring and other details of the brake pressure modulators such as conventional brake pressure modulator 400, but at the same time providing the same functionality as the electronically operated valves and complying with the spatial constraints within the brake pressure modulators.

SUMMARY

It follows from the above section that the cost effective solution is not only in replacing e.g., the existing solenoid valve with a mechanical valve, but obtaining the same functionality using said mechanical valve taking the spatial constraints within the brake pressure modulators into account.

The major object of the present disclosure is to provide a preferred brake pressure modulator wherein said mechanically operable valve is established and integrated in the brake pressure modulator in an advantageous way observing the above conditions.

This objective is achieved through the present disclosure as described herein.

In accordance with an embodiment of the present disclosure, a brake pressure modulator is provided, wherein said modulator includes a relay valve for controlling a supply of pressurized air from a primary source (II) to at least one brake actuator, a first valve sub-unit configured to be electronically actuated, wherein the first valve sub-unit is configured to receive a primary supply pressure form the primary source (II) as well as a connection to the ambient air for exhaust purposes, intended for controlling the relay valve, and a second valve unit configured to at least receive a secondary control pressure from a secondary source ('BST') and at least part of the primary control pressure from the primary source (II) and to transmit either the primary control pressure or the secondary control pressure to the relay valve, and wherein, when the secondary control pressure is transmitted to the relay valve, the primary control pressure from the primary source (II) is disconnected, and/or when the primary control pressure is transmitted to the relay valve, the secondary control pressure from the secondary source (BST) is disconnected.

Furthermore, according to the present disclosure the second valve unit is a mechanically operable valve in the form of a pneumatically controlled valve having a valve casing, the valve casing comprising:

a pressurized guiding sleeve providing a valve chamber configured to axially guide a pressure pickup piston or the like spool adapted for pneumatic actuation thereof, in particular adapted for mere pneumatic actuation thereof, and a coil casing configured to provide a coil chamber peripheral next to the pressurized guiding sleeve, wherein the valve chamber is free of a spring and the coil chamber is free of a coil or the like solenoid, such that the spool is actuable pneumatically only, in particular wherein the spool is subject to a pneumatic force only due to pneumatic pressure in the valve chamber.

In essence, according to the inventive concept the pneumatically controlled valve uses the same components of the prior solenoid valve, but without the spring and electrical coil that is used to excite the spool and/or assist in retaining said spool in the excited position.

One of the technical advantages of providing the mechanically operable valve for the second valve unit is, unlike the second valve unit of conventional brake modulators with electronically controlled solenoid valves, space for wirings and other hardware requirements associated with the solenoid valves are done away with. This has a direct effect on the cost of the product as well as makes the brake pressure modulator more self-reliant and not always dependent on electronic control. In this certain way, the redundant functioning (or functioning of the brake modulator without electronic control) is boosted, at the same time satisfying the safety requirements of the pneumatic braking system. The pneumatically controlled valve enables a simple mechanism in which selective transmission of the brake pressure is taken care of, as only one of the pressure lines can be connected to the relay valve for its actuation and as a result, similar control is achieved, as that which is provided by the usage of solenoid valves, by using the pneumatically controlled valve.

The pneumatically controlled valve can be established as an "only" mechanically operable valve, this is more precisely "only" a mechanically-pneumatically operable valve. This means the mechanically-pneumatically operable valve switches without electrical or electro-magnetic aid.

Apart from this, the mechanically-pneumatically operable valve can be established generally in any advantageous way to be integrated in the brake pressure modulator and configured to switch between a first and a second state when receiving a first and/or second switch-control pressure derived from the primary and/or secondary control pressure.

The present disclosure also leads to a pneumatic brake system having the brake pressure modulator and a vehicle having the pneumatic brake system with the brake pressure modulator.

The pneumatic brake system comprises:

the brake pressure modulator according to the present disclosure or a development thereof;

- a centralized pressure modulator connected to the brake pressure modulator, and
- a centralized electronic control unit operatively associated with the centralized pressure modulator, wherein the centralized electronic control unit transmits control signals to at least the first valve sub-unit.

These and further developed configurations of the present disclosure are further outlined in the present disclosure. The present disclosure provides further embodiments and associated technical advantages. Thereby, the mentioned advantages of the proposed concept are even more improved. For each feature of the present disclosure, it is claimed protection independent from all other features of this disclosure.

In a preferred development the valve chamber provides a spool chamber and a spring chamber, wherein the valve chamber provides an empty and/or hollow spring chamber, in particular wherein a spring space of the valve chamber is free of a spring.

In a preferred development, the coil chamber is empty and/or hollow, in particular wherein the coil chamber provides a coil space, which is free of a coil or the like solenoid.

In a preferred development the pneumatically controlled valve is configured to switch between a first and a second state

- when receiving the primary and/or secondary control pressure, and/or
- when receiving a first and/or second switch-control pressure derived from the primary and/or secondary control pressure.

In an exemplifying preferred first variant, which is described with preferred developments, the mechanically-pneumatically operable valve switches when receiving a first and/or second switch-control pressure against a spring force. In an exemplifying preferred second variant, which is described with preferred developments, the mechanically-pneumatically operable valve switches when receiving a first and/or second switch-control pressure against each other, thus in particular configured to selectively transmit the pressure of a higher magnitude among the primary and secondary control pressures received from the primary source (II) and the secondary source (BST), respectively.

In a preferred development the pressurized guiding sleeve is configured to guide the pressure pickup piston or spool in a first position corresponding to the first state and in a second position corresponding to the second state, in particular wherein the first and second position of the spool are positions on the valve seat and the spool stop respectively.

In a preferred development, the valve chamber extends between a valve seat on a valve body and a spool stop on a first pressure-guiding casing part.

In a preferred development

- a first pressure-guiding casing path provides a first pressurized path and a pressure pickup path, and/or
- the valve body is resided in a second pressure-guiding casing part providing a second pressurized path.

In a preferred development

- the spool includes a rubber base at at least one side of the spool, and/or
- the valve body features a sealing ring.

Furthermore, according to a first variant of development the pneumatically controlled valve is a double check valve, in particular wherein the double check valve is configured to switch between a first and a second state when receiving the primary and/or secondary control pressure. The double sided check valve is configured to selectively transmit the pressure of a higher magnitude among the primary and secondary control pressures received from the primary source (II) and the secondary source (BST), respectively.

Furthermore, according to a second variant of development the second valve unit is a pneumatically controlled 3/2-directional valve that is configured to switch between a first and a second state when receiving a first and/or second switch-control pressure derived from the primary and/or secondary control pressure. More particularly the pneumatically controlled valve, in particular a 3/2-directional valve, is configured to switch from the second to the first state when receiving the first switch-control pressure derived from the primary control pressure such that the primary control pressure is transmitted to the relay valve. More particularly the pneumatically controlled valve, in particular a 3/2-directional valve, is configured to switch from the second to the first state when receiving the first switch-control pressure derived from the primary control pressure such that the primary control pressure is transmitted to the relay valve.

In a particular preferred development, the pneumatically controlled 3/2-directional valve in the second state is adapted to transmit the secondary control pressure to the relay valve and in the first state is adapted to transmit the primary control pressure to the relay valve. These two states have been shown to be particular advantageous to be established in the pneumatically controlled 3-port/2-way-directional valve Thus, in a further particular preferred development, the pneumatically controlled valve, in particular a double check valve or a 3/2-directional valve, is configured to switch from the second to the first state when receiving the first switch-control pressure derived from the primary control pressure such that the primary control pressure is transmitted to the relay valve. In particular, the pneumatically controlled 3/2-directional valve here is arranged according to the above-mentioned first variant and switches a control pressure against a switch-control pressure.

In a particular preferred development, the variants of a double check valve and a 3/2-directional valve can be combined, in particular preferably with omitting the need for a valve spring.

Preferably therein, the pneumatically controlled valve, in particular a double check valve or a 3/2-directional valve, is configured so as to selectively transmit the pressure of a higher magnitude among the primary and secondary control pressures received from the primary source (II) and the secondary source (BST), respectively. In particular, the pneumatically controlled valve here is arranged according to the above-mentioned second variant and switches upon a load by a first and a second switch-control pressure against each other. A respective piston loaded by a first switch-control pressure against a load of a second switch-control pressure of the piston is provided in the pneumatically controlled valve.

In accordance with the same development as above, in which the brake pressure modulator is described, the pneumatically controlled valve, in particular a double check valve or a 3/2-directional valve, includes a spool with two opposing sides, wherein a first one among the two opposite sides receives the pressurized air from the primary source (II) and a second one among the two opposite sides receives the pressurized air from the secondary source (BST). The resulting configuration as provided in this development enables a mechanism that can translate the selective application through simple hardware means i.e., the spool configuration. The linear translation of the spool enables which supply of the pressurized air, i.e., whether from the secondary source or from the primary source, be given priority, based on the respective magnitudes of the pressure.

In accordance with one or more of the above developments, in which the brake pressure modulator is described, the pneumatically controlled valve, in particular a double check valve or a 3/2-directional valve, includes a casing which covers the spool, wherein the spool is configured to linearly translate within the casing, and wherein the direction of movement of the spool within the casing is directly dependent on a difference in the magnitude of the pressure received from primary source (II) and the secondary source (BST). It is one of the most advantageous developments of the present disclosure where the mechanically operable spool valve enables the Boolean operation of supplying the connection with a higher pressure air supply. The surface interaction between the spool and the casing enables realizing the simple mechanism of a three port, two position configuration direction control valve with a minimal number of components.

In the same or different development, in which the brake pressure modulator of the present disclosure is described, the first valve sub-unit is provided which includes two solenoid controlled 2/2 direction control valves and wherein, based on an actuation state of each of the two direction control valves, the brake pressure modulator is configured to perform one of the following functions:

- enabling the supply of the primary control pressure from the primary source (II) to actuate the relay valve;
- disabling or blocking the supply of the primary control pressure from the primary source (II) to the relay valve; or
- releasing the primary control pressure from the primary source (II) to the atmosphere, wherein the primary control pressure is intended for opening the relay valve.

In combination with the simple mechanically operable valve, electronically or solenoid controlled direction valves configure the complex operation of connecting and/or venting the control pressure from the primary source such as reservoir II in a straight forward manner.

In a development, in which the brake pressure modulator is described, the relay valve, the first valve sub-unit, and the second valve unit are encompassed within a single cast body of the brake pressure modulator. For an ease of manufacture, all the components are incorporated in a single cast unit. For instance, aluminum or cast iron could be used make the cast body of the brake pressure modulator.

The brake pressure modulator of any one of the above developments, in one aspect, is for controlling supply of the pressurized air to the brake actuators associated with a front axle of a vehicle.

The brake pressure modulator of any one of the above-discussed developments, in one aspect, is for controlling coupling head control pressure provided to the brake system of a vehicle trailer.

In a development, a pneumatic brake system is disclosed, which system comprises the brake pressure modulator one or more of the above discussed developments, a centralized pressure modulator connected to the brake pressure modulator, and a centralized electronic control unit operatively associated with the centralized pressure modulator, wherein the centralized electronic control unit transmits control signals to at least the first valve sub-unit. In another development, a vehicle comprising the pneumatic brake system is disclosed.

For a more complete understanding of the present disclosure, the present disclosure will now be described in detail with reference to the accompanying drawing. The detailed description will illustrate and describe what is considered as a preferred embodiment of the present disclosure. It should of course be understood that various modifications and changes in form or detail could readily be made without departing from the spirit of the present disclosure. It is intended that the present disclosure may not be limited to the exact form and detail shown and described herein, nor to anything less than the whole of the present disclosure disclosed herein and as claimed hereinafter. Further the features described in the description, the drawing and the claims disclosing the present disclosure may be essential for the present disclosure considered alone or in combination. In particular, any reference signs in the claims shall not be construed as limiting the scope of the present disclosure. The wording "comprising" does not exclude other elements or steps. The wording "a" or "an" does not exclude a plurality. The wording, "a number of" items, comprises also the number one, i.e. a single item, and further numbers like two, three, four and so forth.

BRIEF DESCRIPTION OF THE ACCOMPANYING DRAWINGS

Figure 2:
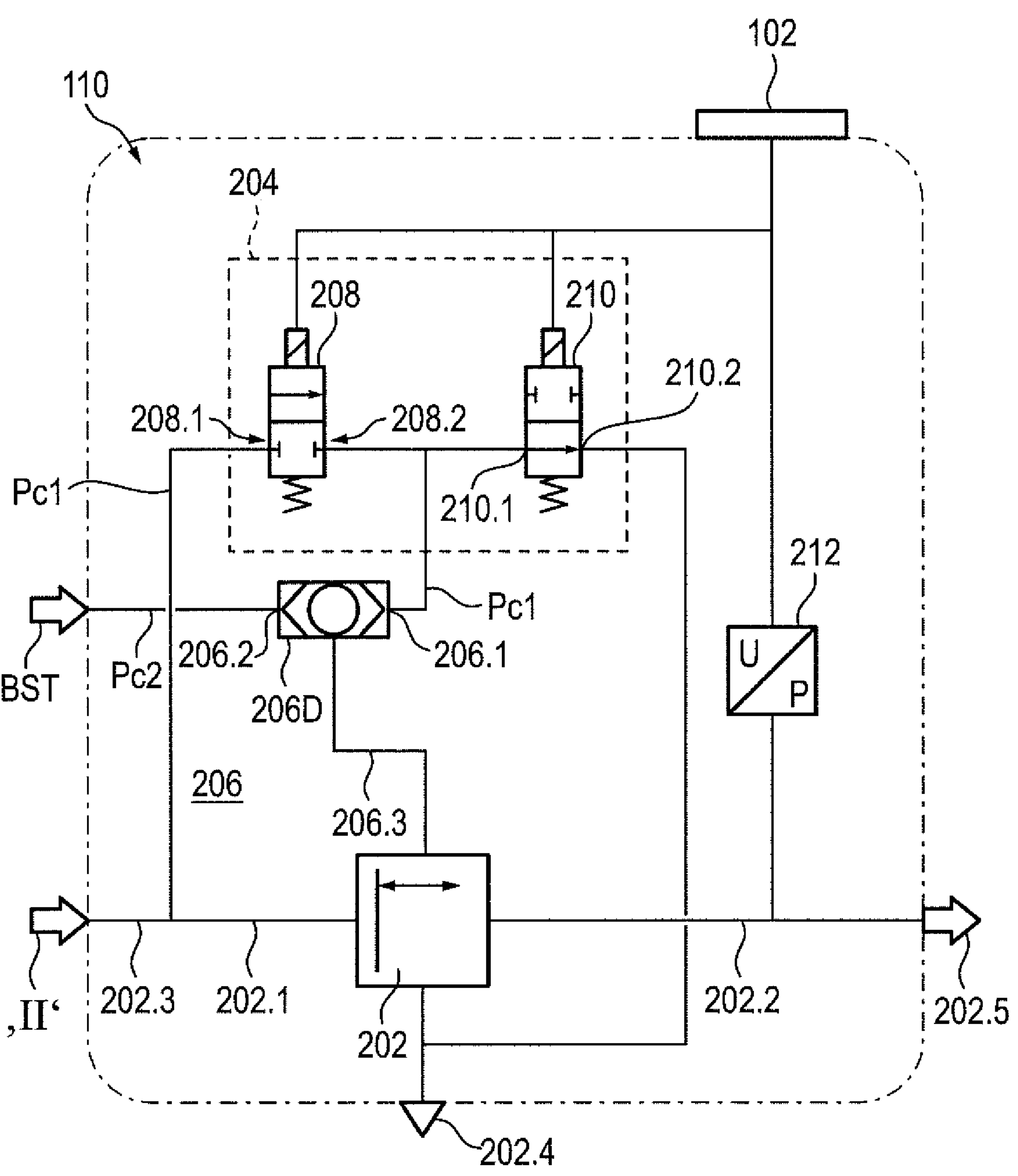
FIG. 2 illustrates a brake pressure modulator with the mechanically operable valve in the form of a pneumatically controlled double check valve in accordance with a preferred embodiment of the present disclosure.
Figure 2A:
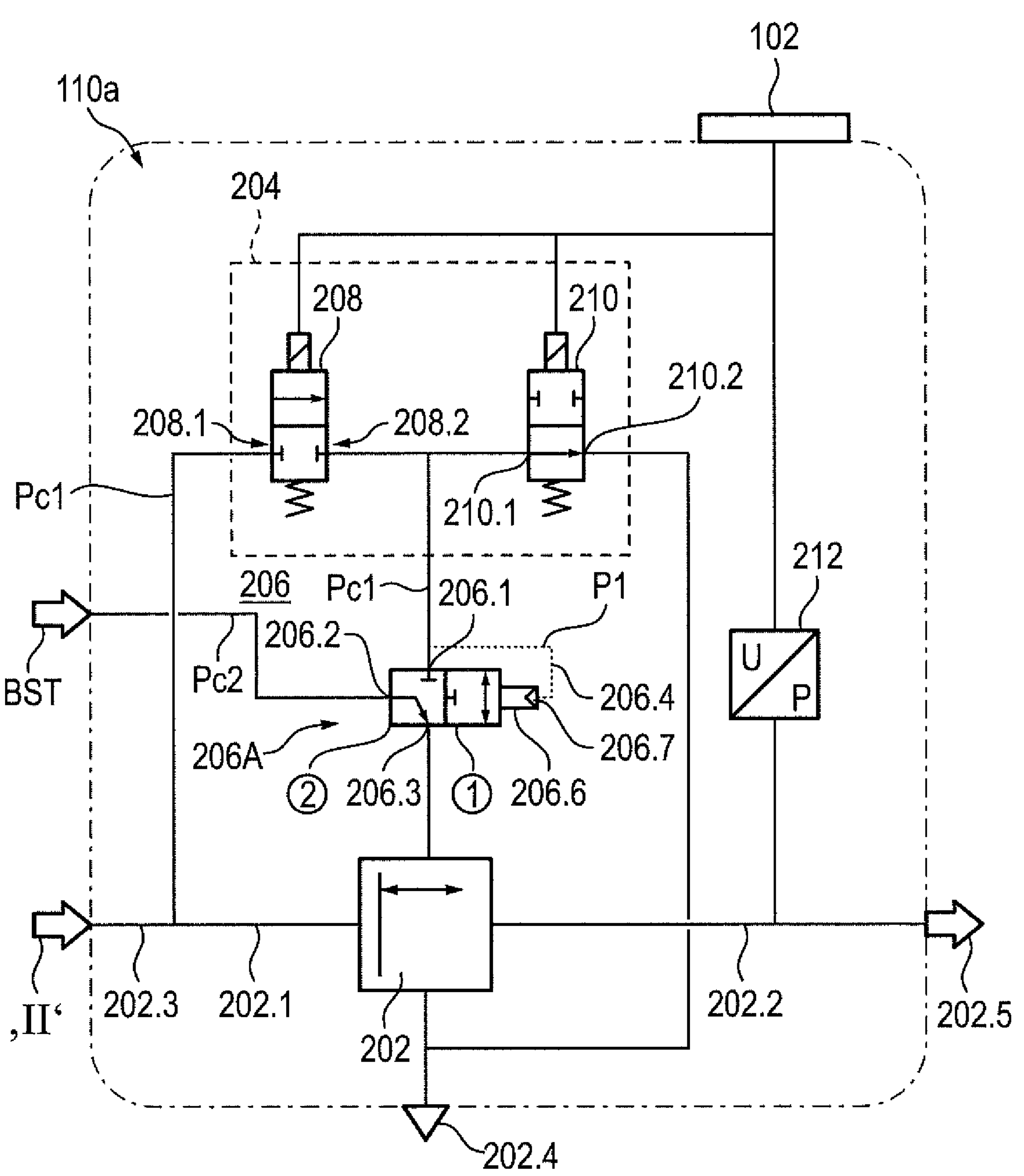
Figure 2B:
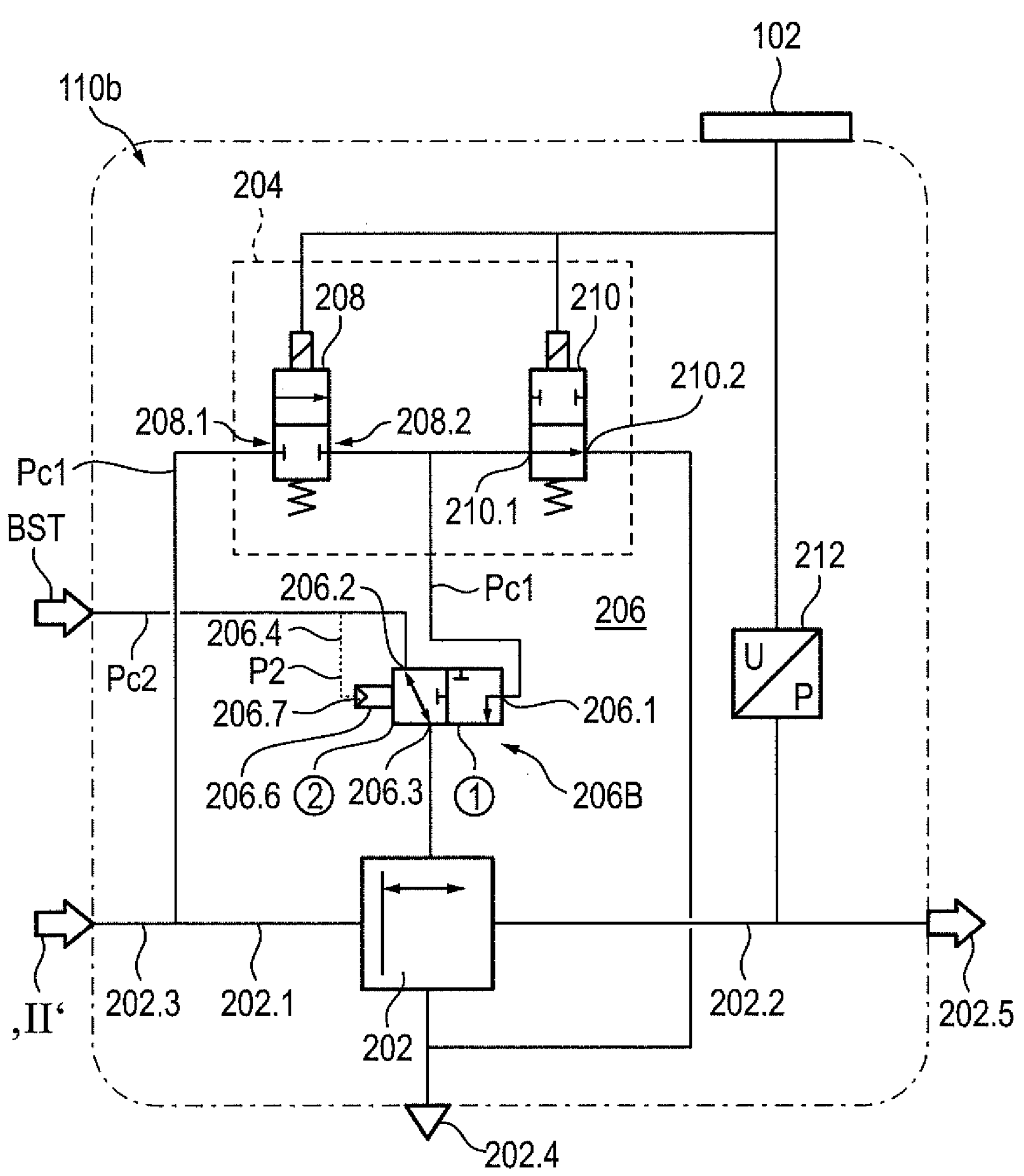
Figure 2C:
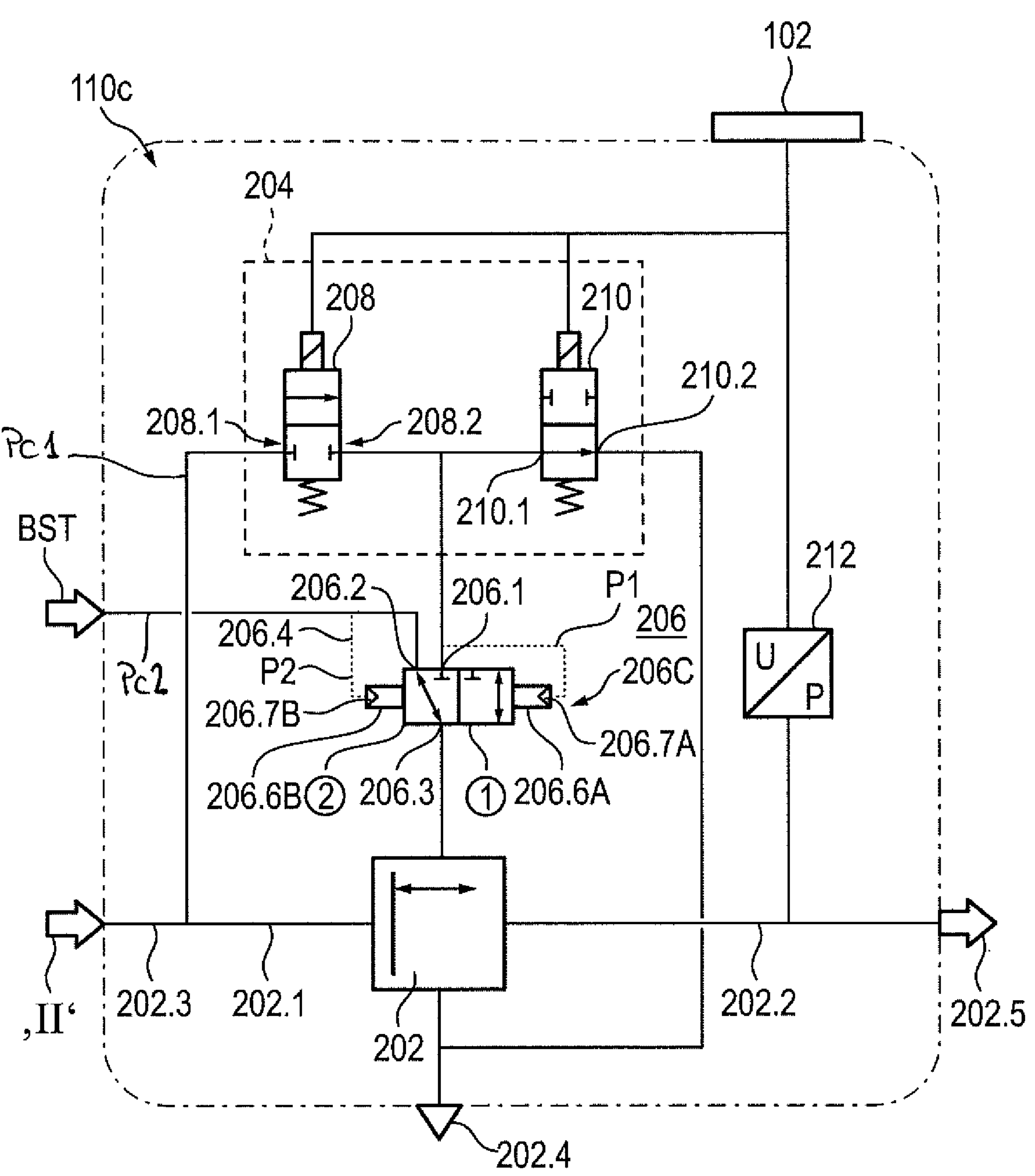
Figure 3A:
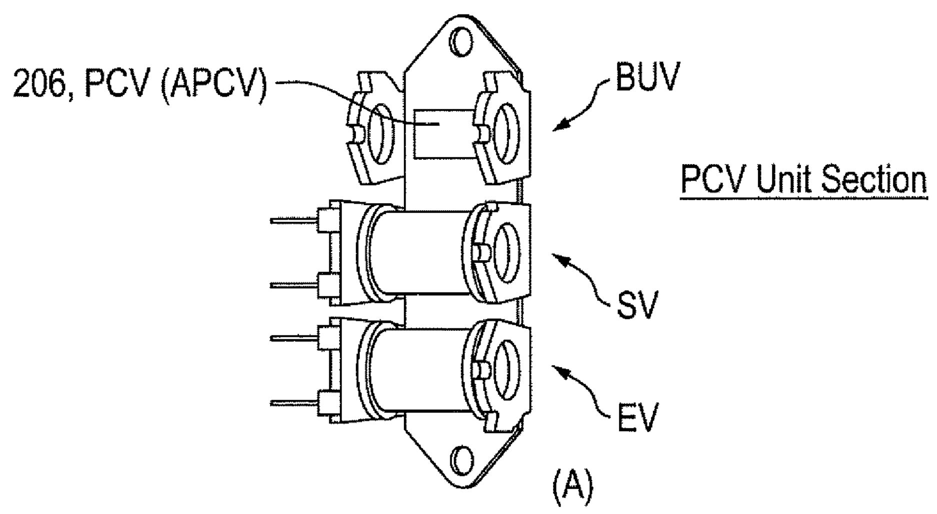
Figure 3A:
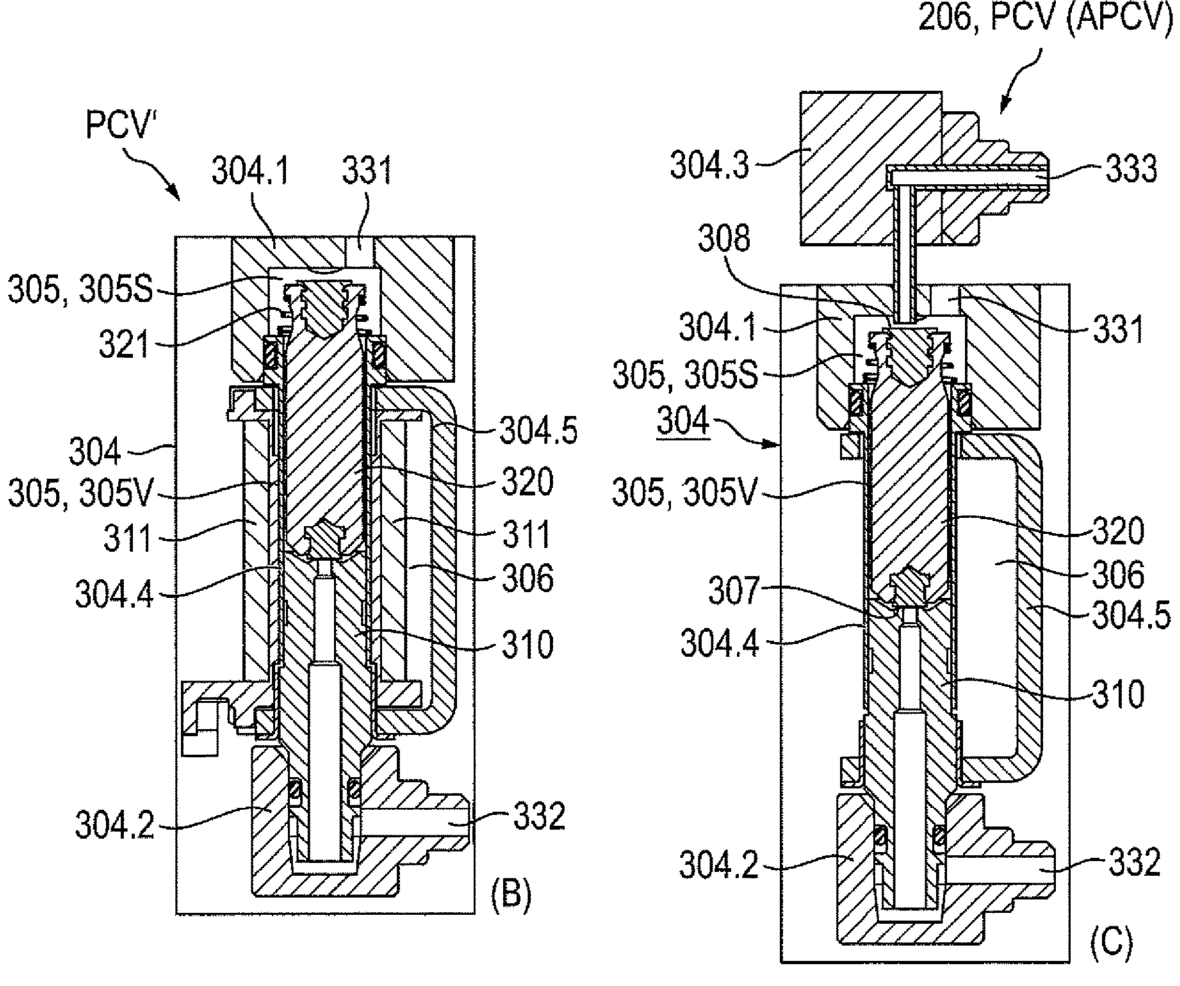
Figure 3B:
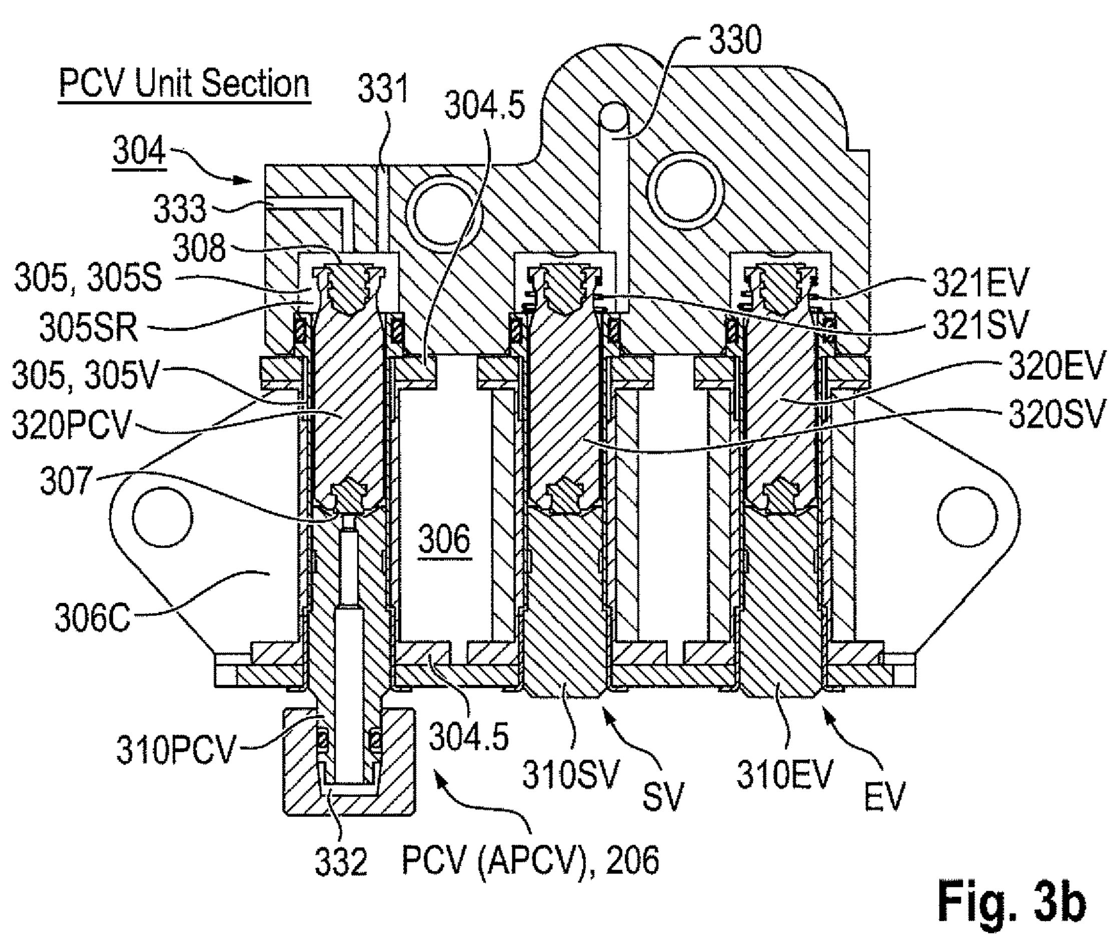
Figure 3C:
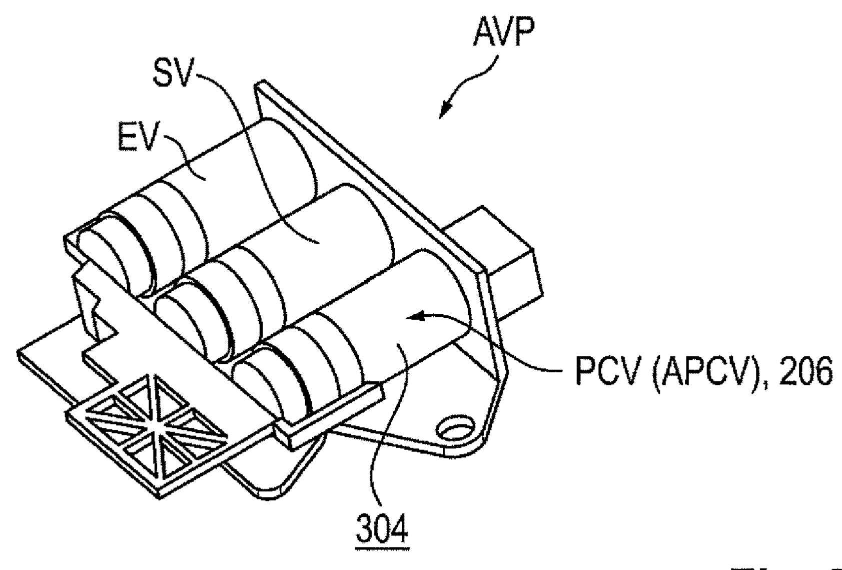
Figure 3D:
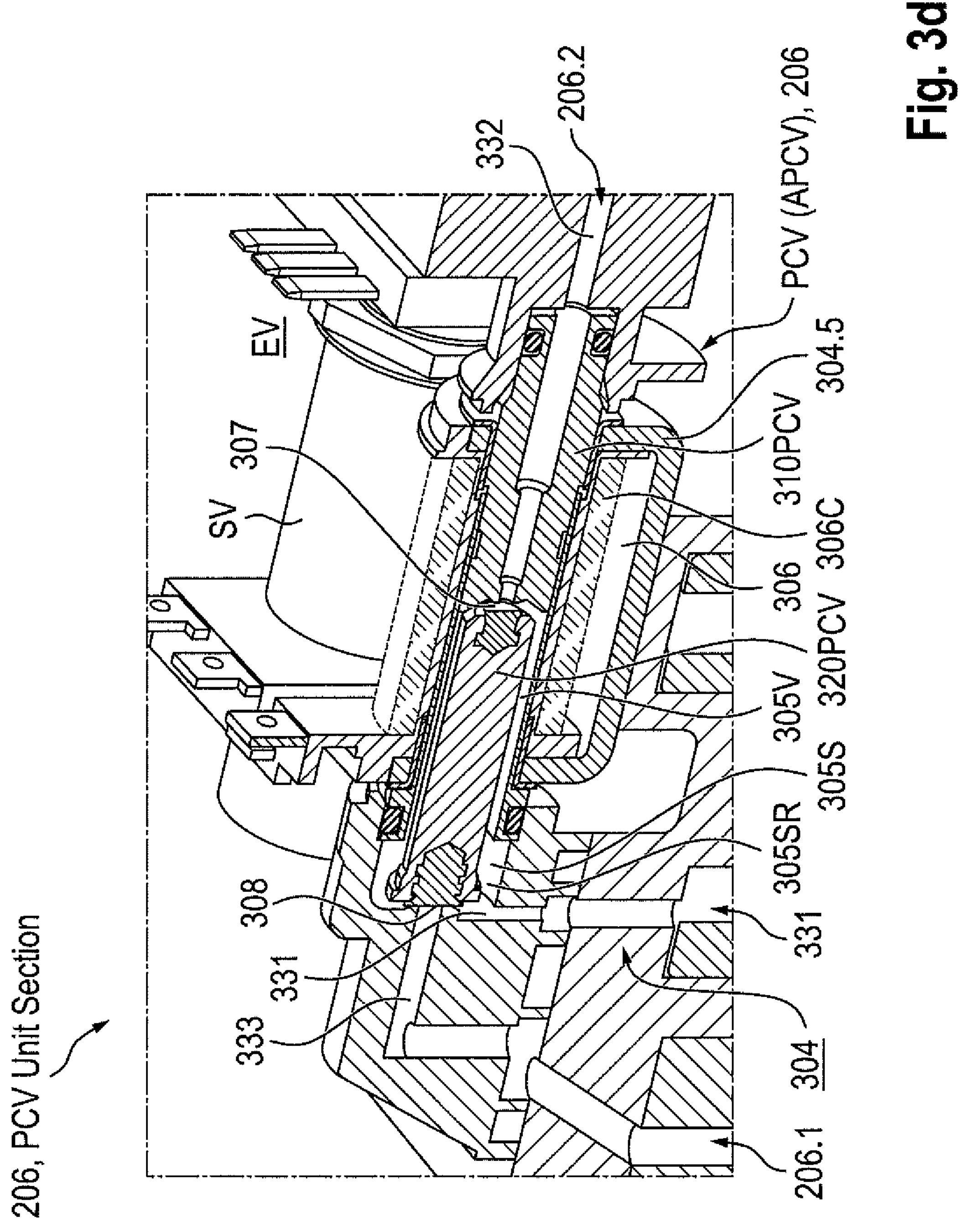
Figure 3E:
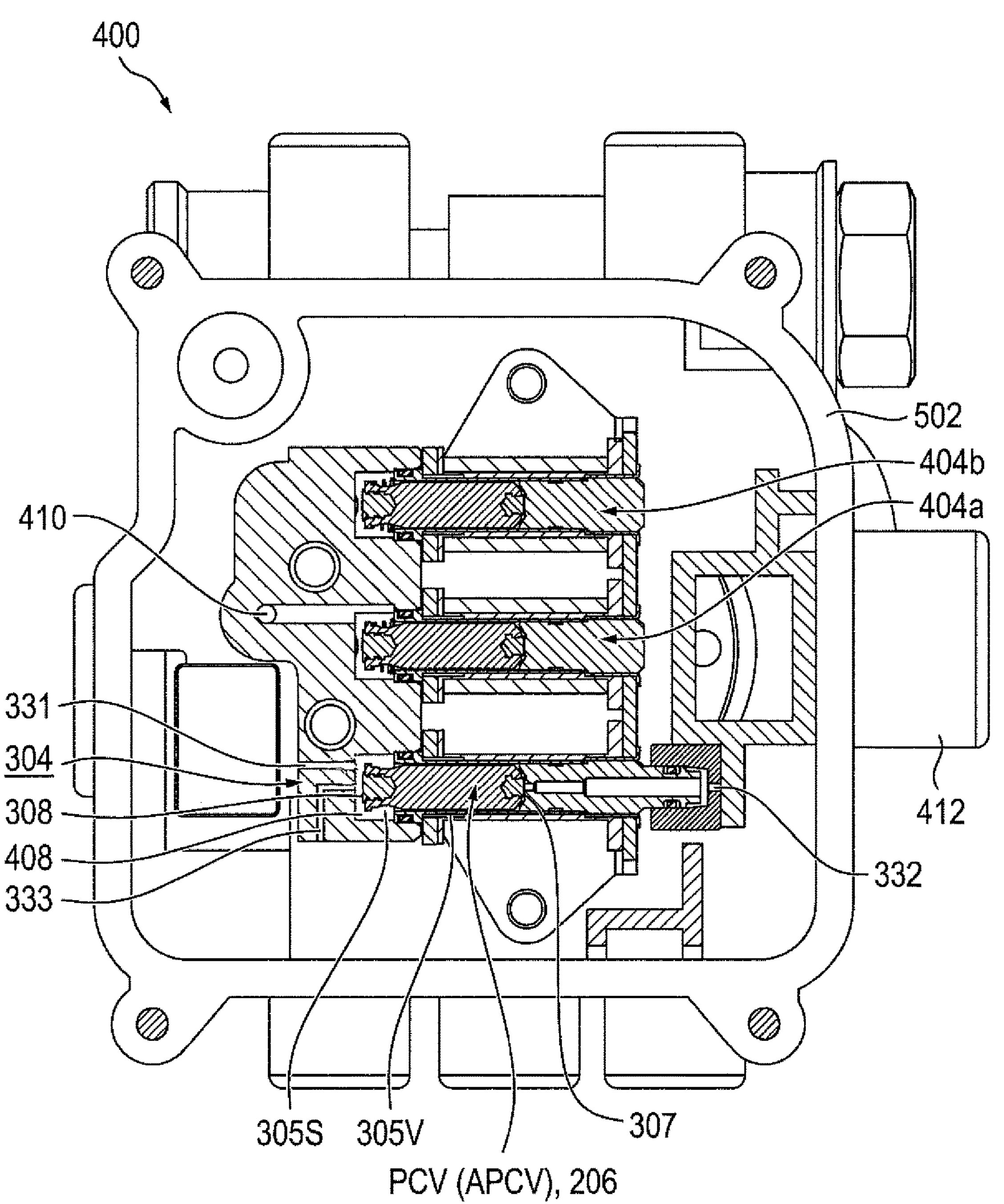

FIG. 2*a* illustrates a brake pressure modulator with the mechanically operable valve in form of a pneumatically controlled 3/2-directional valve in accordance with a preferred embodiment of the present disclosure;

FIG. 2*b* illustrates a brake pressure modulator with the mechanically operable valve in form of a pneumatically controlled 3/2-directional valve in accordance with a preferred embodiment of the present disclosure;

FIG. 2*c* illustrates a brake pressure modulator with the mechanically operable valve in form of a pneumatically controlled 3/2-directional valve in accordance with a preferred embodiment of the present disclosure;

FIG. 3*a* illustrates a mechanically operable valve (pressure control valve, PCV, in particular axle PCV (APCV)) in the form of a pneumatically controlled valve of the brake pressure modulator as a PCV-unit-section for an axle valve package (AVP),

- in view (A), in a schematic view the position of the pressure control valve PCV for the brake pressure modulator as a PCV-unit-section is shown, and
- in view (C), as an embodiment of the present disclosure in a cut out sectional view of the pneumatically controlled 3/2-directional valve, as compared to an embodiment not belonging to the present disclosure shown in view (B) of a conventional electro-magnetic controlled 3/2-directional valve;

FIG. 3*b* illustrates the brake pressure modulator with a PCV unit section, wherein the axle PCV (APCV) as a preferred embodiment is shown in a cross-sectional view;

FIG. 3*c* illustrates the brake pressure modulator of FIG. 3*a* view (A) with the pressure control valve PCV in assembled form;

FIG. 3*d* illustrates the brake pressure modulator as a PCV-unit-section with a PCV, respectively a APCV (axle pressure control valve), in a perspective partly cut out view to the APCV (axle pressure control valve) which is used instead of an electronically actuable valve;

FIG. 3*e* illustrates the brake pressure modulator in assembled form with the PCV of FIG. 3*b;*

Figure 4:
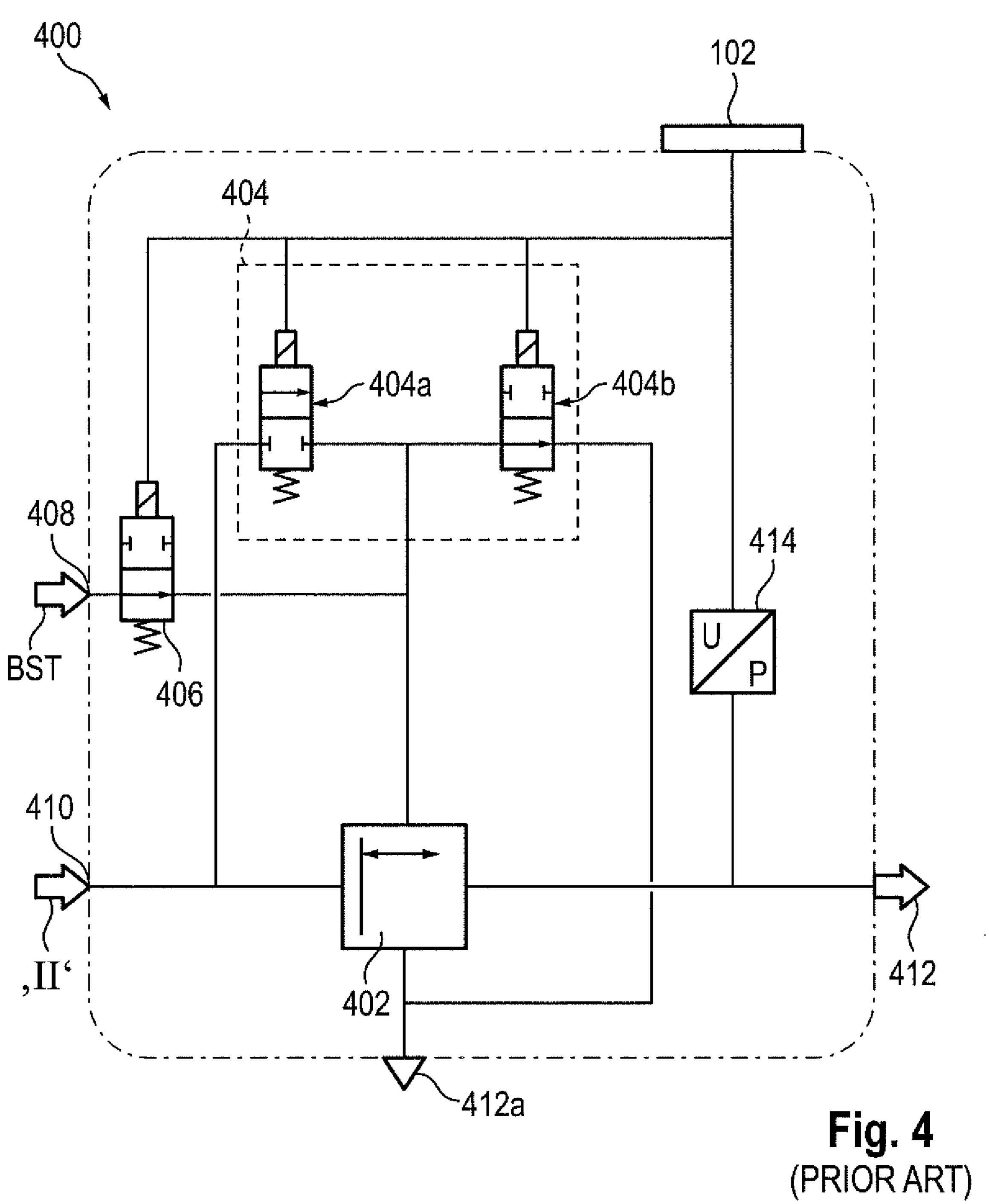
Figure 5:
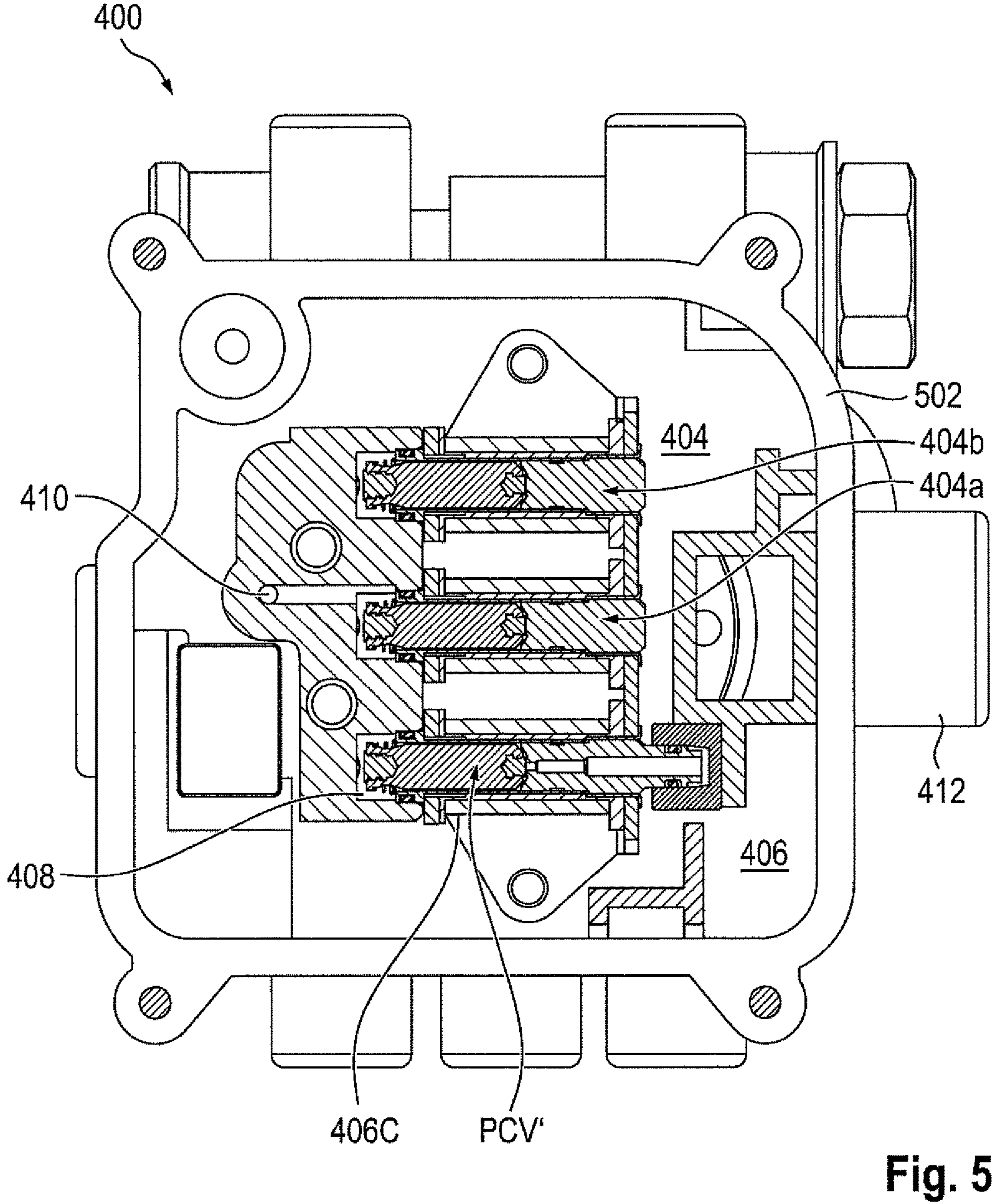

FIG. 4 illustrates a conventional brake pressure modulator of prior art with electronically actuable valves; and FIG. 5 illustrates a cross-sectional view of the conventional brake pressure modulator of FIG. 4.

Further details and advantages of different components are explained in the detailed description provided below. The labeling of the elements of different drawings is not to be construed as limiting. The scope of the present invention is defined by one or more claims listed under 'claims' section.

For identical or equivalent items or items of identical or equivalent function in the following, the some reference marks are used. For corresponding features, thus it is referred to the above description.

DETAILED DESCRIPTION

Figure 1:
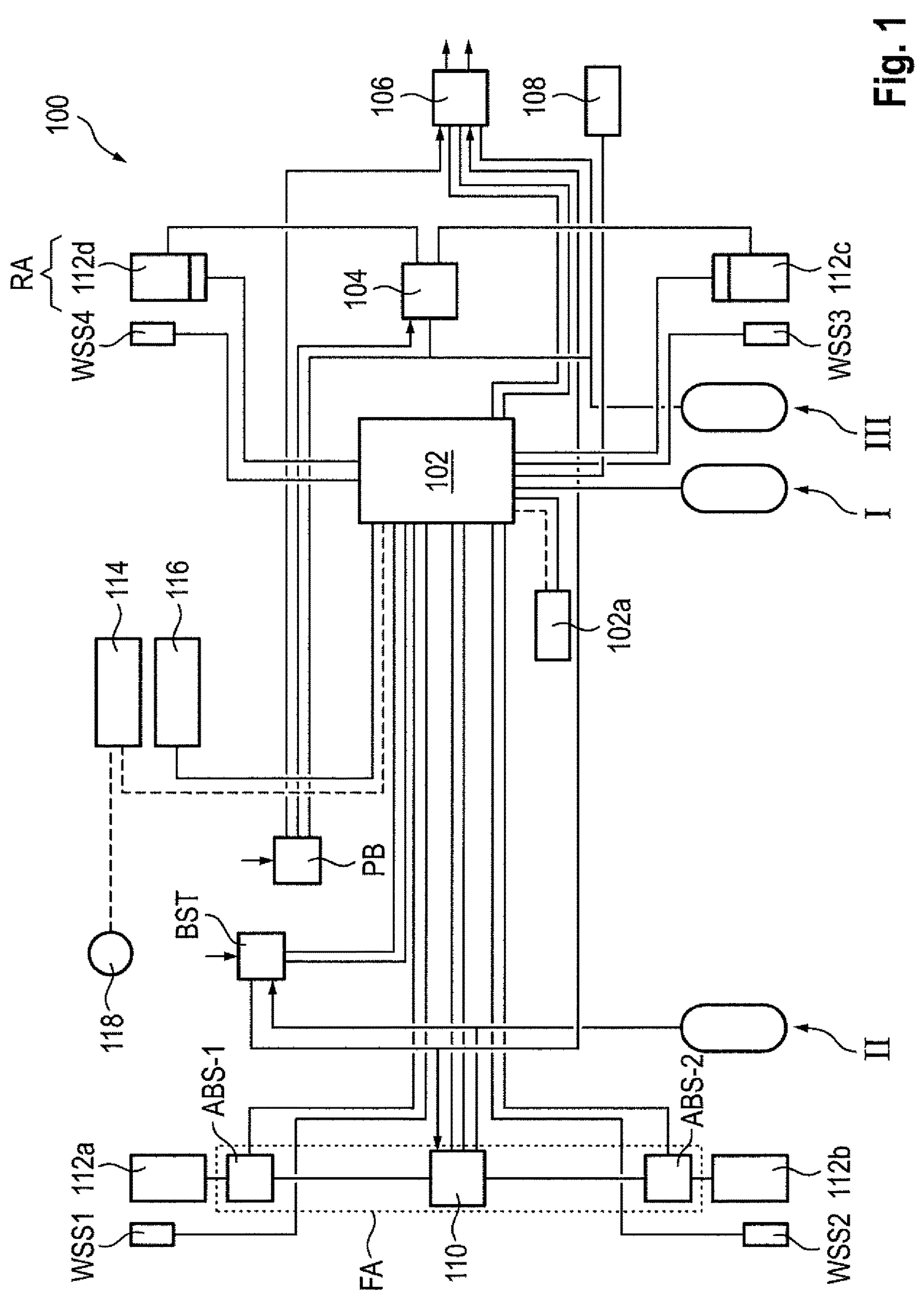
FIG. 1 illustrates a pneumatic brake system of a vehicle in accordance with an embodiment of the present disclosure.

FIG. 1 illustrates a pneumatic brake system 100 of a vehicle (not labeled) in accordance with an embodiment of the present disclosure. Alternatively, the vehicle (not labeled) includes pneumatic brake system 100.

Pneumatic brake system 100 in general includes a centralized (brake) pressure modulator 102, which is configured, inter alia, to receive a brake control input in the form of control pressure from a brake signal transmitter (labeled as 'BST' in FIG. 1) and in a preferred embodiment, to receive electronic signals from Electronic Stability Controller Module (ESCM) 102*a* connected to it via e.g. CAN (Controller Area Network) bus. In a further preferred embodiment, centralized pressure modulator 102 is also connected to a Power Line Carrier (PLC) 108 that is connected, for example, to a trailer (not shown in FIG. 1). It is noted that the driver of the vehicle actuates a brake pedal or BST to supply brake pressure to wheel end actuators 112*a*, 112*b*, 112*c*, 112*d* associated with different wheels (not shown in the figure).

In modern pneumatic brake systems such as the one shown in FIG. 1, the BST simply transmits an electronic signal using a stroke sensor (not shown in FIG. 1) to read a control output from a brake pedal (not shown in FIG. 1) to a central brake pressure modulator unit provided in combination with centralized pressure modulator 102. Said stroke sensor (not shown in FIG. 1) is configured to read or determine the movement of a plunger as a result of the driver applying pressure on the brake pedal.

On receiving the control inputs from the BST, centralized pressure modulator 102 transmits control pressure to the brake pressure modulators, in particular to the ones located at front axle 'FA' as well as to the brake pressure modulator assigned for trailer brakes. In FIG. 1, the brake pressure modulator assigned for the front axle brakes is labeled as "110" and the brake pressure modulator assigned for the trailer brakes is labeled as "106". From the respective brake pressure modulators, the control pressure is transferred to respective wheel end actuators 112*a*, 112*b*, 112*c* and 112*d* through which the vehicle brakes are applied.

Furthermore, there different accumulators or reservoirs displayed in FIG. 1 are for supplying pressurized air to different receivers present within pneumatic brake system 100. For instance, reservoir 'I' is configured to supply pressurized air to wheel end actuators 112*c* and 112*d* present at the rear axle of the vehicle whereas reservoir 'III' is predominantly for applying parking brakes and supplying pressurized air to trailer brake pressure modulator 106. Reservoir 'II' is for supplying pressurized air to front axle brake control modulator 110.

Pneumatic brake system 100 of the present embodiment also additionally discloses wheel speed sensors WSS1, WSS2, WSS3 and WSS4 located at each of the wheels to determine their rotational speeds, a CAN network unit 114 (refers to a networking unit operating via CAN protocol), an on-board battery 116, and a steering angle sensor 118. The functioning of these components is not part of the present disclosure and therefore, no further explanation is provided in this regard.

Additionally, pneumatic brake system 100 includes also park brake control unit denoted as—PB—in FIG. 1. For instance, PB is connected to brake pressure modulator 104, which in accordance with an embodiment used for modulating parking brakes, and which is also associated with the spring brakes (or e.g., the actuators 112*c* and 112*d*) of a rear axle, (denoted as—'RA'—in FIG. 1).

Further details of brake pressure modulators 110 and/or 106 of the present disclosure are provided in the forthcoming sections. To the extent the subject-matter of the present disclosure relates to the brake pressure modulator 110 associated with front axle FA of the vehicle, the underlying features of the claimed present disclosure and the technical teaching associated with the brake pressure modulators provided at other parts of pneumatic brake system 100, including centralized pressure modulator 102, trailer brake pressure modulator 106 and exceptionally, rear axle pressure modulator 104.

FIG. 2, FIG. 2*a*, FIG. 2*b* and FIG. 2*c* each respectively in a scheme of circuit diagram illustrate a brake pressure modulator 110, 110*a*, 100*b*, 100*c* in accordance with an embodiment of the present disclosure, which each can be provided as a brake pressure modulator 110, 106—in particular the front axle brake control modulator 110 and/or a trailer brakes pressure modulator 106—shown in FIG. 1.

As shown in each of FIG. 2, FIG. 2*a*, FIG. 2*b* and FIG. 2*c* the brake pressure modulator 110, 110*a*, 100*b*, 110*c*, respectively, comprises a relay valve 202 for controlling a supply of pressurized air from a primary source (II) to at least one brake actuator of 112*a*, 112*b* (see FIG. 1). For instance, actuation of relay valve 202 enables connection between supply lines 202.1 and 202.2. Supply line 202. 1 is connected to reservoir 'II' (see FIG. 1) whereas supply line 202.2 leads to Anti-lock Braking System valves ABS-1 and ABS-2 (see FIG. 1) and consequently, to wheel end actuators 112*a* and 112*b*.

However, in order to open and/or close relay valve 202, typically, a control pressure is required.

As can be derived similarly from each of FIG. 2, FIG. 2*a*, FIG. 2*b* and FIG. 2*c* this control pressure is received from a second valve unit 206. The second valve unit 206, in accordance with the present embodiments of FIG. 2, FIG. 2*a*, FIG. 2*b* and FIG. 2*c*, is a mechanically operable valve in form of a pneumatically controlled valve, also referred to with reference mark 206 for the second valve unit.

In turn, the second valve unit 206 receives control pressure inputs from either of control input lines 206.1 and 206.2. In an exemplary embodiment, control input line 206.1, for instance, is connected to a first valve sub-unit 204 whereas control input line 206.2 is connected to BST (see FIG. 1).

The second valve unit 206 is a mechanically operable valve, which will now be described below with regard to FIG. 2 in detail as a pneumatically controlled double check valve 206D of the second valve unit 206. The description also holds for FIG. 2*a*, FIG. 2*b* and FIG. 2*c* in principle; details and differences follow with explicit reference to FIG. 2*a*, FIG. 2*b* and FIG. 2*c*.

In accordance with the present embodiment—exemplary with regard to FIG. 2—first valve sub-unit 204 is configured to be electronically actuated, wherein first valve sub-unit 204 is configured to receive a primary control pressure Pc1 from the primary source such as reservoir 'II' intended for opening relay valve 202. For instance, see e.g. reference sign 202.3 where connection to reservoir II is shown to bifurcate, wherein one direction leads to supply line 202.1 and another direction leads to port 208.1 of a first solenoid controlled 2/2 direction control valve 208 of first valve sub-unit 204.

Further, in accordance with the same embodiment, the second valve unit 206 is a mechanically operable valve. It is configured to at least receive a secondary control pressure Pc2 from a secondary source (such as 'BST' of FIG. 1) and at least part of the primary control pressure Pc1 from the primary source (such as reservoir 'II' of FIG. 1) and to transmit either the primary control pressure Pc1 or the secondary control pressure Pc2 to the relay valve 202. This is in particular for activation of the relay valve 202 to e.g., open, and wherein, when the secondary control pressure is transmitted to the relay valve 202, the primary control pressure from the primary source (such as reservoir 'II' of FIG. 1) is disconnected and/or when the primary control pressure is transmitted to the relay valve 202, the secondary control pressure from the secondary source (BST) is disconnected.

In accordance with this preferred embodiment, it should be noted that the second valve unit 206 receives at least part of the primary control pressure Pc1 from the primary source via the first valve sub-unit 204.

In accordance with the present embodiment, the first valve sub-unit 204 includes two solenoid controlled 2/2 direction control valves 208, 210 and wherein, based on an actuation state of each of the two direction control valves 208 and 210, brake pressure modulator 110 is configured to perform one of the following functions:

- enabling the supply of the primary control pressure from the primary source (II) to actuate relay valve 202;
- disabling or blocking the supply of the primary control pressure from the primary source (II) to relay valve 202; and
- releasing the primary control pressure from the primary source (II) to the atmosphere, wherein the primary control pressure is intended for opening relay valve 202.

The embodiment of FIG. 2 provides a mechanically operable valve, which is functioning like and—in this embodiment—is formed as a pneumatically controlled double check valve 206D; the structure is advantageously integrated in the brake pressure modulator 110 as will be further elucidated with regard to FIG. 3*a* to FIG. 3*e*.

The mechanically operable valve according to further embodiments of the second valve unit 206 will be described below with regard to FIG. 2*a*, FIG. 2*b* and FIG. 2*c* in detail. Namely in these further embodiments the mechanically operable valve is a pneumatically controlled 3/2-directional valve that is configured to switch between a first and a second state when receiving a first and/or second switch-control pressure P1, P2 derived from the above mentioned primary and/or secondary control pressure Pc1, Pc2; at least the embodiment of FIG. 2*c* is operated in a nearest analogy to the embodiment of a pneumatically controlled double check valve 206D in FIG. 2.

In FIG. 2*a*, FIG. 2*b* and FIG. 2*c*, respectively, each embodiment features a pneumatically controlled 3/2-directional valve 206A, 206B, 206C and in the second state (shown in the figures FIG. 2*a*, FIG. 2*b* and FIG. 2*c*) it is adapted to transmit the secondary control pressure Pc2 to the relay valve 202 and in the first state it is adapted to transmit the primary control pressure Pc1 to the relay valve 202. These two states have been shown to be particular advantageous to be established in the pneumatically controlled 3-port/2-way-directional valve 206A, 206B, 206C.

Like the double check valve 206D in FIG. 2, as described above, the pneumatically controlled 3/2-directional valve 206A, 206B, 206C is established as an "only" mechanically operable valve; this is more precisely "only" a mechanically-pneumatically operable valve. This means the mechanically-pneumatically operable valve switches without electrical or electro-magnetic aid. In these embodiments of FIG. 2*a*, FIG. 2*b*, FIG. 2*c* the mechanically-pneumatically operable valve is established in form of the pneumatically controlled 3/2-directional valve 206A, 206B, 206C configured to switch between a first and a second state when receiving a first and/or second switch-control pressure P1, P2 derived from the primary and/or secondary control pressure and/or above mentioned primary and/or secondary control pressure Pc1, Pc2—the choice of control is different in each of the embodiments shown in FIG. 2*a*, FIG. 2*b*, FIG. 2*c*. This being said, at least the embodiment of the pneumatically controlled 3/2-directional valve 206C of FIG. 2*c* is operated similarly to the embodiment of a pneumatically controlled double check valve 206D of FIG. 2. The "only" mechanically operable valve replaces an electro-magnetic actuable pneumatic valve of the valve unit with electronically actuable valve 406 shown in FIG. 4 and FIG.

The mechanically operable valve—in particular the double check valve 206D in FIG. 2 or the pneumatically controlled 3/2-directional valve 206A, 206B, 206C—is advantageously integrated in the brake pressure modulator 110, 106 as will be further elucidated with regard to FIG. 3*a* to FIG. 3*e*.

In an exemplifying preferred first variant, which is described with the embodiments of FIG. 2*a* and FIG. 2*b* the mechanically-pneumatically operable valve in form of the pneumatically controlled 3/2-directional valve 206A, 206B switches when receiving a first and/or second switch-control pressure P1, P2 against a primary and/or secondary control pressure Pc1, Pc2. This means the mechanically-pneumatically operable valve switches without the aid of a solenoid.

In the embodiment of FIG. 2*a* the pneumatically controlled 3/2-directional valve 206A is configured to switch from the second state "2" to the first state "1" when receiving the first switch-control pressure P1 in switch-control line 206.4 derived from the primary control pressure Pc1 such that the primary control pressure Pc1 from control input line 206.1 is transmitted to the relay valve 202 via control output line 206.3. In particular, the pneumatically controlled 3/2-directional valve 206A operates according to the above-mentioned first variant, and switches against a secondary control pressure Pc2. A respective piston 206.6, loaded by a first switch-control pressure P1 against a secondary control pressure Pc2 load of the piston 206.6, is provided in the pneumatically controlled 3/2-directional valve. The piston 206.6 is pressure loaded with first switch-control pressure P1 via a respective pressure port 206.7.

In the embodiment of FIG. 2*b* the pneumatically controlled 3/2-directional valve 206B is configured to switch from the first state "1" to the second state "2" when receiving the second switch-control pressure P2 in switch-control line 206.4 derived from the secondary control pressure Pc2 such that the secondary control pressure Pc2 from control input line 206.2 is transmitted to the relay valve 202 via control output line 206.3. In particular, the pneumatically controlled 3/2-directional valve 206B operates according to the above-mentioned first variant, and switches against a primary control pressure Pc1. A respective piston 206.6, loaded by second switch-control pressure P2 against a primary control pressure Pc1 load of the piston 206.6, is provided in the pneumatically controlled 3/2-directional valve. The piston 206.6 is pressure loaded with second switch-control pressure P2 via a respective pressure port 206.7.

In an exemplifying embodiment of a second variant, which is described with the embodiment of FIG. 2*c*, the mechanically-pneumatically operable valve 206C—without a spring—switches when receiving a first and/or second switch-control pressure P1, P2 against each other. Thus, in particular, it is configured to selectively transmit the pressure of a higher magnitude among the primary and secondary control pressures received from the primary source (II) and the secondary source (BST), respectively. This means also that this mechanically-pneumatically operable valve 206C switches without the aid of a solenoid. Pistons 206.6A and 206.6B are pressure loaded via respective pressure ports 206.7A and 206.7B with first and second switch-control pressure P1, P2.

Thus, in a particular preferred embodiment both variations of FIG. 2*a* and FIG. 2*b* can be combined, in particular preferably with omitting the need for a valve spring. Preferably therein, the pneumatically controlled 3/2-directional valve 206C is configured so as to selectively transmit the pressure of a higher magnitude among the primary and secondary control pressures received from the primary source (II) and the secondary source (BST), respectively. In particular, the pneumatically controlled 3/2-directional valve 206C operates according to the above-mentioned second variant, and switches upon loads by a first and a second switch-control pressure P1, P2 against each other. A respective piston 206.6A loaded by a first switch-control pressure P1 against a load of a second switch-control pressure P2 of the piston 206.6B is provided in the pneumatically controlled 3/2-directional valve.

In accordance with the same embodiment as above, in which the brake pressure modulator 110 is described, the pneumatically controlled 3/2-directional valve 206A, 206B, 206C or a double check valve 206D includes a spool 320 with two opposing sides, wherein a first one among the two opposite sides receives the pressurized air from the primary source (II) and a second one among the two opposite sides receives the pressurized air from the secondary source (BST). The resulting configuration as provided in this embodiment enables a mechanism that can translate the selective application through simple hardware means i.e., the spool configuration. The linear translation of the spool 320 enables which supply of the pressurized air i.e., whether from the secondary source or from the primary source be given priority, based on the respective magnitude of the pressure.

In accordance with one or more of the above embodiments, in which the brake pressure modulator 110 is described, the pneumatically controlled 3/2-directional valve 206A, 206*b*, 206C or double check valve 206D includes a casing 304 which covers the spool 320, wherein the spool 320 is configured to linearly translate within the casing 304, and wherein the direction of movement of the spool 320 within the casing 304 is directly dependent on a difference in the magnitude of the pressure received from primary source (II) and the secondary source (BST). It is one of the most advantageous embodiment of the present disclosure where the mechanically operable spool valve enables the Boolean operation of supplying the connection with a higher pressure air supply. The surface interaction between the spool 320 and the casing 304 enables realizing the simple mechanism of three ports, to position the direction control valve with a minimal number of components.

An additional function of releasing the primary control pressure towards second valve unit 206 with the pneumatically controlled 3/2-directional valve 206A, 206B, 206C or double check valve 206D is also provided, which will be explained below. The functions listed above will be explained in detail as follows.

For instance, when first solenoid controlled 2/2 direction control valve 208 is in an open state, supply of at least part of the primary control pressure from the primary source such as reservoir II is allowed. When said valve 208 is in a closed state, the supply of the primary control pressure from the primary source (II) to relay valve 202 is either disabled or blocked. In the same example, when valve 208 is in the open state, the primary control pressure exits valve 208 at port 208.2.

It follows from the above, when second controlled 2/2 direction control valve 210 is in an open state, the primary control pressure is exhausted at port 202.4. However, when second solenoid controlled 2/2 direction control valve 210 is closed, the primary control pressure from valve 208 is directed to port 206.1 of second valve unit 206. In accordance with this embodiment, valve 210 includes first and second connection ports 210.1 and 210.2 where first connection port 210.1 is configured to act as inlet port for valve 210 and second connection port 210.2 is configured to act as outlet port for valve 210.

Further, in the present embodiment of brake pressure modulator 110*a*, 110*b*, 110*c*, the second valve unit 206 is a pneumatically controlled 3/2-directional valve 206A, 206B, 206C or double check valve 206D that is configured to switch between a first and a second state when receiving a primary and/or secondary control pressure and/or a first and/or second switch-control pressure derived from the primary and/or secondary control pressure. The pneumatically controlled 3/2-directional valve 206A, 206B, 206C or double check valve 206D in the second state is adapted to transmit the secondary control pressure to the relay valve 202 and in the first state is adapted to transmit the primary control pressure to the relay valve 202.

In the embodiment of the first variant as shown in FIG. 2*a*, the pneumatically controlled 3/2-directional valve 206A is configured to switch from the second state "2" to the first state "1" when receiving the first switch-control pressure P1 derived from the primary control pressure Pc1 such that the primary control pressure Pc1 is transmitted to the relay valve 202. In the embodiment of the first variant as shown in FIG. 2*b*, the pneumatically controlled 3/2-directional valve 206B is configured to switch from the first state "1" to the second state "2" when receiving the second switch-control pressure P2 derived from the secondary control pressure Pc2 such that the secondary control pressure Pc2 is transmitted to the relay valve 202.

In the embodiment of the second variant as shown in FIG. 2*c*, the pneumatically controlled 3/2-directional valve 206C is configured to selectively transmit the pressure of a higher magnitude among the primary and secondary control pressures Pc1, Pc2 received from the primary source (II) and the secondary source (BST), respectively.

For instance, more details on the pneumatically controlled 3/2-directional valve 206A, 206B, 206C or double check valve 206D and its functioning are explained in conjunction with FIG. 3*a* to FIG. 3*e* below.

The primary technical advantage of the presence of the mechanically operable valve in form of the pneumatically controlled 3/2-directional valve 206A, 206B, 206C or double check valve 206D is to, for instance, prevent additional wiring elements and associated space constraints by simply providing a mechanical solution that is workable in all pressure differential conditions. For instance, a minor difference in pressure magnitude between the pressurized air received from e.g., ports 206.1 and 206.2 causes spool 320 to move. This provides for the pressure with higher magnitude to be supplied for actuating relay valve 202 and to open connection between lines 202.1 and 202.2. For a manufacturer, such as the Applicant, considering the number of products manufactured, this results in also considerable cost savings.

Still further, as mentioned before, brake pressure modulator 110*c* of the present embodiment of the pneumatically controlled 3/2-directional valve 206C or double check valve 206D includes the spool 320, in particular, with two opposing sides, wherein a first one among the two opposite sides receives the pressurized air from the primary source (II) e.g., via port 206.1 and a second one among the two opposite sides receives the pressurized air from the secondary source (BST) e.g., via port 206.2, as shown in FIG. 2.

In accordance with one of the advantageous embodiments of the present application, in particular the pneumatically controlled 3/2-directional valve 206C or double check valve 206D, a valve casing 304 covers the spool 320, wherein the spool 320 is configured to linearly translate within the casing 304 and wherein the direction of movement of the spool 320 within the casing 304 is directly depended on a difference in the magnitude of the pressure received from primary source (II) and the secondary source (BST). Further details on the type of functioning of the pneumatically controlled 3/2-directional valve 206C or double check valve 206D and its technical characteristics are explained in reference to FIGS. 3*a* to 3*e* below.

Finally, a pressure sensor 212 is provided in supply pressure line 202.2 connecting relay valve 202 and port 202.5, which connects to actuators 112*a* and 112*b*. This pressure sensor 212 sends readings to centralized brake pressure modulator 102, for instance, to determine the presence of flow of pressurized air in line 202.2 and or the magnitude of the pressure.

In an exemplary embodiment, it should be noted that valves 208, 210 are electronically actuable based on the pressure modulating signals received from centralized pressure modulator 102. For instance, electronically controlled braking processes such as Electronic Braking System, anti-roll braking methods, anti-skid braking methods, anti-jack-knifing methods are implemented through the controlled logic stored in centralized pressure modulator 102, which naturally may include an electronic processing unit or electronic control unit of suitable caliber.

More particularly, as has been indicated with FIG. 2*a*, FIG. 2*b*, FIG. 2*c* the mechanical pneumatic pressure control valve is formed as a 3/2-switch valve 206A, 206B, 206C or a double check valve 206D as will be described further below, respectively and has been indicated in FIG. 2*a*, FIG. 2*b*, FIG. 2*c* already, namely as a 3/2-mechanical pneumatic switch valve 206A, 206B, 206C or a double check valve 206D with a pressure pickup piston or spool 320 as is shown in FIG. 3*a*, view (C).

This is indicated by the pressure pickup casing part 304.3 for receiving the pickup pressure to the pressure pickup piston or spool, which is more generally the pressure pickup piston or spool 320 as shown in view (C) of FIG. 3*a*—the pressure pickup piston or spool 320 corresponds to piston 206.6, 206.6A, 206.6B as outlined above. This is, the pneumatically controlled valve 206D, 206A, 206B, 206C is configured to switch between a first and a second state when receiving the primary and/or secondary control pressure Pc1, Pc2, and/or when receiving a first and/or second switch-control pressure P1, P2 derived from the primary and/or secondary control pressure Pc1, Pc2.

The brake pressure modulator 110,106 thus has the pressurized guiding sleeve 304.4, which is configured to guide the pressure pickup piston or spool 320 in a first position corresponding to the first state and in a second position corresponding to the second state, in particular wherein the first and second position of the spool 320 are positions on the valve seat 307 and the spool stop 308, respectively, as shown in FIG. 3*a* view (C).

FIG. 3*a* schematically illustrates the principle of the present disclosure; the inventive principle can be drawn from a comparison of three views (A), (B) and (C) of FIG. 3*a* thereof.

Therein, in view (A), a picture of a pressure control valve unit section (PCV-unit section) is shown; in the instant case, the PCV-unit section is provided as an axle valve package AVP. The PCV-unit section is shown with an exhaust valve EV and a supply valve SV and a position for a back-up valve BUV. The back-up valve BUV deliberately is missing therein in a free space, which has been chosen for reasons of illustration.

To be inserted in said free space, a back-up valve BUV is provided as a pressure control valve PCV' as commonly known and shown in view (B) of FIG. 3*a* or in the present case—according to an embodiment of the instant present disclosure—as a pressure control valve PCV as shown in view (C) of FIG. 3*a*.

Therein—in view (B) of FIG. 3*a*—, a further control valve is shown as a magneto-pneumatic valve. In contrast, in view (C), the pressure control valve 206, PCV is shown according to the concept of the present disclosure as a mechanical pneumatic valve; namely as a mechanically and pneumatically controlled 3/2-directional valve 206A, 206B, 206C with a pressure pickup piston or spool 320 as described above.

In the instant case, the PCV-Unit section is formed as an axle PCV valve unit section APCV and the backup valve BUV is formed as an axle valve of the axle valve package respectively—this is, the backup valve is formed as an axle valve whereas the pressure control valve unit section is formed as an axle valve package AVP. Still further, the embodiment shown herein with regard to an axle valve package are also suitable to be applied to a trailer valve package TVP that follows the same principle corresponding to the following embodiments. Hereinafter, it is referred to the backup valve BUV as a pressure control valve, axle pressure control valve respectively (PCV).

As shown in view (B) of FIG. 3*a*, at first, a usual pressure control valve PCV', as for instance shown with FIG. 4 as an electro pneumatic 2/2-valve, is shown. The pressure control valve PCV' has a commonly known valve casing 304 with a first pressure-guiding casing part 304.1 and a second pressure-guiding casing 304.2. According to the present disclosure, shown in view (C), a pressure pickup casing part 304.3 in case of the PCV according to the present disclosure is associated with the valve casing 304. Further, between the first pressurized part 304.1 and 304.2, the pressurized guiding sleeve 304.4 holds therein a valve body 310 with valve seat 307, a pressure pickup piston or spool 320 for interaction to close and open respectively the first and second pressurized path 331, 332, in particular the respective first and second pressurized port 331, 332 in the first and second pressure-guiding casing part 304.1, 304.2 to selectively guide pressurized air through the valve body 304.

As clearly visible, in view (B) of FIG. 3*a*, the pressure control valve PCV' is in the form of a magneto-pneumatic switch valve, wherein the solenoid piston interacts upon force applied by a solenoid 311 to the pressure pickup piston or spool 320 against the force of a spring 321 provided in the above-mentioned first pressure-guiding casing part 304.1. In addition, the coil casing 304.5 of the valve casing 304 is shown to cover and hold the solenoid 311.

Going from view (B) to view (C) of FIG. 3*a*, the comparison indicates the main differentiating feature in the pressure control valve PCV of the present disclosure as regards the structural assembly thereof.

The present disclosure starts from the fact that while a mechanical pneumatic pressure control valve PCV has advantages in operation, still nevertheless, packaging thereof in an axle or trailer valve package is also efficient for low weight and package volume of a pressure control valve PCV to be reduced.

According to the present disclosure, the inventive pressure control valve PCV, as shown in the preferred embodiments of FIG. 2*a*, FIG. 2*b* and FIG. 2*c* here in FIG. 3*a* view (C), for a PCV unit section as shown in view (A) of FIG. 3*a*, is free of the solenoid 311 and also free of the spring 321—in contrast to the electro-pneumatic pressure control valve PCV'; the pressure control valve according to the present disclosure PCV is structured as a mechanical pneumatic pressure control valve without spring and without solenoid 321, 311.

More clearly, it is seen therefrom in view (C) of FIG. 3*a* that the second valve unit 206 is a mechanically operable valve, in form of a pneumatically controlled valve 206D, 206A, 206B, 206C, and has a valve casing 304. The valve casing 304 comprises:

- a pressurized guiding sleeve 304.4 providing a valve chamber 305 configured to axially guide a pressure pickup piston or spool 320 adapted for pneumatic actuation thereof, in particular adapted for mere pneumatic actuation thereof, and
- a coil casing 304.5 configured to provide a coil chamber 306 peripheral next to the pressurized guiding sleeve 304.4.

Therein, the valve chamber 305 is free of a spring 321 and the coil chamber 306 is free of a coil or solenoid 311, such that the spool 320 is actuable pneumatically only, in particular wherein the spool 320 is subject to a pneumatic force only due to pneumatic pressure in the valve chamber 305.

FIG. 3*b* shows, in detail, an axle pressure control valve APCV as a particular embodiment of the pressure control valve PCV of the present disclosure as shown in view (C) of FIG. 3*a*. The axle pressure control valve APCV is shown as part of an APCV valve unit section in a cross-sectional view with the APCV to form the backup valve, respectively the pressure control valve, a supply valve SV, and an exhaust valve EV.

The supply valve SV and the exhaust valve EV are generally of a known kind with pressure path connected in the APC valve unit section wherein the pressure path 330 is directed to the first pressure path 333, in particular port, and a second pressure path 332, in particular port, as indicated above and further, the pressure pickup path 331, in particular port, as has been shown with view (C) of FIG. 3*a*.

Whereas the solenoids 311SV, 311EV of the supply valve SV and the exhaust valve EV and also the solenoid 311 of the pressure control valve PCV', are indicated with similar reference marks, and also the pressure pickup piston or spools 320SV, 320EV, 320, still nevertheless, it is to be recognized that the pressure pickup piston or spools 320SV, 320EV are activated under force of a solenoid 311EV, 311SV respectively and spring 321EV, 321SV respectively against a valve seat on the valve body 310SV, 310EV respectively—however, a solenoid and possibly also spring as indicated with 321, 311 in view (B) of FIG. 3*a* is missing in the pressure control valve as part of the APCV.

Still nevertheless, the APCV is well suitable to be assembled in the axle valve package as shown in FIG. 3*b* and FIG. 3*c*; more particularly, it has been shown that by forming the APCV as a pneumatically controlled 3/2-directional valve 206A, 206B, 206C or double check valve 206D—that is configured to switch between a first and a second state when receiving a first and/or second switch-control pressure P1, P2 derived from the primary and/or secondary control pressure Pc1, Pc2 as described above, or directly when receiving the primary and/or secondary control pressure Pc1, Pc2 as described above with a pressure pickup piston or spool 320—said APCV, according to the concept of the present disclosure, can use the same package structure as a magneto-pneumatic APCV with a magneto-pneumatic pressure control valve PCV' (as shown in view (B) of FIG. 3*a*).

Thus, although a mechanically operable valve for use as a pressure control valve PCV in principle can be construed in other forms, still nevertheless, the form of the instantly invented 3/2-mechanical pneumatic switch valve with a pressure pickup piston or spool 320 is particularly useful, as the packaging structure as such is preserved, which has various advantages with consistency and conformity of existing products and assembly thereof.

FIG. 3*d* shows the backup valve BUV, respectively pressure control valve PCV, namely, in particular in this case the axle pressure control valve APCV as part of the APCV valve unit section in a three-dimensional cutout sectional view, wherein the pressure ports 333, respectively 206.1 from pilot valves, and 332, respectively 206.2 from control port BST, are shown in addition to the control port 331, to connect to the relay control, in the main body sleeve of the pressure control valve PCV.

Clearly, it is seen—from FIG. 3*d* in common with FIG. 3*a* (C) and FIG. 3*b*—that the valve chamber 305 provides a spool chamber 305V and a spring chamber 305S, wherein the valve chamber 305 provides an empty and/or hollow spring chamber 305S, in particular wherein a spring space 305SR of the valve chamber 305 is free of a spring. In addition, the coil chamber 306 is empty and/or hollow, in particular wherein the coil chamber 306 provides a coil space 306C, which is free of a coil solenoid 311 (thus indicated in fading dashed lines; which means that the coil space 306C has no solenoid 311).

The valve chamber 305 extends between a valve seat 307 on a valve body 310, 310PCV, as described before, and a spool stop 308 on a first pressure-guiding casing part 304.1. The brake pressure modulator 110,106 thus provides for a first pressure-guiding casing part 304.1, which has a first pressurized path 333 and a pressure pickup path 331, and the valve body 310 is disposed in a second pressure-guiding casing part 304.2 providing a second pressurized path 332.

Therein the spool 320 includes a rubber base at at least one side of the spool 320, and the valve body 310 features a sealing ring.

The principle, as elucidated above, will be shown in a more technical view of the axle valve package AVP in a cross-sectional view as shown in FIG. 3*e* as follows. FIG. 3*e* illustrates a cross-sectional view of brake pressure modulator 110 in accordance with an embodiment of the present disclosure. As can be noticed in FIG. 3*e* a brake pressure modulator 110 of the present disclosure is shown to include the pneumatically controlled 3/2-directional valve 206A, 206B, 206C or a double check valve 206D in the same position as electro-magnetic actuable valve 406 provided in conventional brake pressure modulator 400 of FIG. 5, without effecting further detailed changes relative to housing 312 of brake pressure modulator 400.

In the same embodiment, it is also clear that the spatial arrangement of each of two solenoid controlled 2/2 direction control valves 208, 210 within brake pressure modulator 110 or 106 is the same as the spatial requirement of double sided check valve 206.

One of the technical advantages of the present disclosure is that the (only) pneumatically controlled valve—3/2-directional valve 206A, 206B, 206C or a double sided check valve 206D such as described above—of the present disclosure, and also solenoid operated valve 406 of a conventional brake modulator 400, even though provided in the same spatial constraints, act in a similar manner in allowing both pneumatic control from BST as well as electric control provided by first valve sub-unit 204.

This, as already mentioned throughout the application, results in a considerable cost saving and has an effect on the total pricing of brake pressure modulators such as '110' or '106'. For a volume manufacturer, such as the applicant, this results in not only simply constructed brake pressure modulator, may also reduce the assembly costs.

LIST OF REFERENCES (PART OF THE DESCRIPTION)

100—pneumatic brake system
102—centralized pressure modulator
102*a*—Electronic Stability Controller Module (ESCM)
104—brake pressure modulator
106—trailer brake pressure modulator
108—Power Line Carrier (from trailer side)
110—front axle brake control modulator
112*a*, 112 *b*—brake actuators at front axle
112*c*, 112*d*—brake actuators at rear axle
114—CAN network unit
116—on-board battery
118—steering angle sensor
FA, RA—front axle, rear axle
WSS1, WSS2, WSS3, WSS4—Wheel speed sensors associated with respective wheels
I, II, III—reservoirs
PB—Parking Brake
BST—Brake Signal Transmitter
ABS1, ABS2—Anti-lock Braking System
202—relay valve
202.1, 202.2—supply lines
202.3—connection to reservoir II
202.4, 202.5—connection port
204—first valve sub-unit
206 the second valve unit; a mechanically operable valve in form of a pneumatically controlled valve
206A, 206B, 206C pneumatically controlled valve as a 3/2-directional valve
206D pneumatically controlled valve as a double check valve
P1, P2 first and/or second switch-control pressure
Pc1, Pc2 primary and/or secondary control pressure
206.1, 206.2 control input lines
206.3 control output line
206.4 switch-control line
206, 206.6A, 206.6B pistons
206.7, 206.7A, 206.7B pressure ports
208—first solenoid controlled 2/2 direction control valve
208.1, 208.2—connection ports of first solenoid controlled 2/2 direction control valve 208
210—second solenoid controlled 2/2 direction control valve
210.1, 210.2—first and second connection ports for second solenoid controlled 2/2 direction control valve
212, 414—pressure sensor
EV exhaust valve
SV supply valve
PCV, PCV', APCV pressure control valve, axle package pressure control valve
PCV unit section pressure control valve unit section
AVP axle valve package
BUV back-up valve
304 valve casing
304.1 first pressure-guiding casing part
304.2 second pressure-guiding casing part
304.3 pressure pickup casing part
304.4 pressurized guiding sleeve
304.5 coil casing
305 valve chamber
305S spring chamber
305V spool chamber
305SR spring space in spring chamber 305S
306 coil chamber
306C coil space in coil chamber 306
307 valve seat
308 spool stop
310 valve body
310PCV valve body PCV
310EV valve body EV
310SV valve body SV
320 pressure pickup piston or spool
320PCV spool of PCV
320EV spool of EV
320SV spool of SV
330 pressure path
311 solenoid
311EV solenoid EV
311SV solenoid SV
321 spring
321EV spring EV
321SV spring SV
333 first pressurized path
332 second pressurized path
331 pressure pickup path
400 conventional brake pressure modulator
402 relay valve
404*a*, 404*b*, 406*c* electronically actuable valves
PCV' electronically actuable pressure control valve
404, 406 first and second valve unit with electronically actuable valves 404*a*, 404*b*, 406*c*
408 control pressure inlet
410 inlet
412 outlet 502 modulator housing

The invention claimed is:

1. A brake pressure modulator (110, 110*a*, 110*b*, 110*c*, 106), comprising:

a relay valve (202) for controlling a supply of pressurized air from a primary source (II) to at least one brake actuator (112*a*, 112*b*);

a first valve sub-unit (204) configured to be electronically actuated, wherein the first valve sub-unit (204) is configured to receive a primary control pressure from the primary source (II) intended for opening the relay valve (202); and a second valve unit (206) configured to at least receive a secondary control pressure from a secondary source ('BST') and at least part of the primary control pressure from the primary source (II) and to transmit either the primary control pressure or the secondary control pressure to the relay valve (202), wherein, when the secondary control pressure is transmitted to the relay valve (202), the primary control pressure from the primary source (II) is disconnected, and when the primary control pressure is transmitted to the relay valve (202), the secondary control pressure from the secondary source (BST) is disconnected, wherein the second valve unit (206) is a mechanically operable valve, in form of a pneumatically controlled valve (206D, 206A, 206B, 206C) having a valve casing (304), the valve casing (304) comprising:

a pressurized guiding sleeve (304.4) having a guiding sleeve wall defining a valve chamber (305) that axially guides a pressure pickup piston or spool (320) adapted for pneumatic actuation thereof, and a coil casing (304.5) defining a coil chamber (306) adjacent to the pressurized guiding sleeve (304.4), wherein the coil chamber includes an open space that is radially adjacent and outside of the guiding sleeve wall, wherein the open space is sized and configured to extend around the guiding sleeve wall, wherein the valve chamber (305) is free of a spring (321) and the open space of the coil chamber (306) is free of a coil and free of a solenoid (311), such that the spool (320) is actuable pneumatically only, wherein the spool (320) is subject to a pneumatic force only due to pneumatic pressure in the valve chamber (305);

wherein the guiding sleeve (304.4) and the guiding sleeve wall are axially fixed relative to each other, wherein the pressure pickup piston or spool (320) slidably moves within the guiding sleeve wall.

2. The brake pressure modulator (110, 106) of claim 1, wherein the valve chamber (305) defines a spool chamber (305V) and a spring chamber (305S), wherein the spring chamber is an empty and/or hollow spring chamber (305S), wherein a spring space (305SR) of the valve chamber (305) and spring chamber (305S) is free of the spring (321).

3. The brake pressure modulator (110, 106) of claim 1, wherein the coil chamber (306) is empty and/or hollow, wherein the open space of the coil chamber (306) defines a coil space (306C), which is free of the coil and free of the solenoid (311).

4. The brake pressure modulator (110,106) of claim 1, wherein the pneumatically controlled valve (206D, 206A, 206B, 206C) switches between a first and a second state when receiving the primary and/or secondary control pressure (Pc1, Pc2), and/or when receiving a first and/or second switch-control pressure (P1, P2) derived from the primary and/or secondary control pressure (Pc1, Pc2).

5. The brake pressure modulator (110,106) of claim 4, wherein the pressurized guiding sleeve (304.4) guides the pressure pickup piston or spool (320) in a first position corresponding to the first state and in a second position corresponding to the second state, wherein the first and second position of the spool (320) correspond to positions on a valve seat (307) and a spool stop (308) respectively.

6. The brake pressure modulator (110,106) of claim 1, wherein the valve chamber (305) extends between a valve seat (307) on a valve body (310) and a spool stop (308) on a first pressure-guiding casing part (304.1).

7. The brake pressure modulator (110,106) of claim 1, wherein a first pressure-guiding casing part (304.1) defines a first pressurized path (333) and a pressure pickup path (331), and a valve body (310) of the pneumatically controlled valve is disposed in a second pressure-guiding casing part (304.2) defining a second pressurized path (332).

8. The brake pressure modulator (110,106) of claim 1, wherein the spool (320) includes a rubber base at at least one side of the spool, and a valve body (310) of the pneumatically controlled valve includes a sealing ring.

9. The brake pressure modulator (110, 106) of claim 1, wherein the pneumatically controlled valve (206D) is a double check valve, wherein the double check valve switches between a first and a second state when receiving the primary and/or secondary control pressure (Pc1, Pc2).

10. The brake pressure modulator (110,106) of claim 1, wherein the pneumatically controlled valve (206) is a double check valve (206D) or a 3/2-directional valve (206A, 206B, 206C) and selectively transmits the pressure of a higher magnitude among the primary and secondary control pressures provided by the primary source (II) and the secondary source (BST), respectively.

11. The brake pressure modulator (110,106) of claim 1, wherein the pneumatically controlled valve (206) is a double check valve (206D) or a 3/2-directional valve (206A, 206B, 206C) and includes the pressure pickup piston or spool (320), wherein the pressure pickup piston or spool (320) includes two opposite sides, wherein a first one of the two opposite sides receives the pressurized air from the primary source (II) and a second one of the two opposite sides receives the pressurized air from the secondary source (BST).

12. The brake pressure modulator (110,106) of claim 1, wherein the pneumatically controlled valve (206) is a double check valve (206D) or a 3/2-directional valve (206A, 206B, 206C) and includes a valve casing (304) that covers the pressure pickup piston or spool (320), wherein the spool (320) linearly translates within the valve casing (304), and wherein the direction of movement of the spool (320) within the valve casing (304) is, directly or indirectly, dependent on a difference in the magnitude of the pressure received from primary source (II) and the secondary source (BST).

13. The brake pressure modulator (110,106) of claim 1, wherein the first valve sub-unit (204) includes two solenoid controlled 2/2 direction control valves (208, 210) and wherein, based on an actuation state of each of the two direction control valves, the brake pressure modulator (110, 106) performs one of the following functions:

enabling the supply of the primary control pressure (Pc1) from the primary source (II) to actuate the relay valve (202);

disabling or blocking the supply of the primary control pressure (Pc1) from the primary source (II) to the relay valve (202); or releasing the primary control pressure (Pc1) from the primary source (II) to the atmosphere, wherein the primary control pressure (Pc1) is intended for opening the relay valve (202).

14. The brake pressure modulator (110,106) of claim 13, wherein a spatial arrangement of each of the two solenoid controlled 2/2 direction control valves (208, 210) within the brake pressure modulator (110,106) is same as a spatial requirement of the pneumatically controlled valve (206) in the form of a double check valve (206D) or a 3/2-directional valve (206A, 206B, 206C).

15. The brake pressure modulator (110,106) of claim 1, wherein the brake pressure modulator (110, 106) controls supply of the pressurized air to the brake actuators (112*a*, 112*b*) associated with a front axle (FA) of a vehicle.

16. The brake pressure modulator (106) of claim 1, wherein the brake pressure modulator (106) controls coupling head control pressure provided to a brake system of a vehicle trailer.

17. The brake pressure modulator (110; 106) of claim 1, wherein the brake pressure modulator (110; 106) is installed in a pneumatic brake system (100) comprising:

a centralized pressure modulator (102) connected to the brake pressure modulator (106; 110), and a centralized electronic control unit operatively associated with the centralized pressure modulator (102), wherein the centralized electronic control unit transmits control signals to at least the first valve sub-unit (204).

18. The brake pressure modulator (110; 106) of claim 17, wherein the brake pressure modulator (110; 106) and pneumatic brake system (100) are installed in a vehicle.

19. A brake pressure modulator (110, 110*a*, 110*b*, 110*c*, 106), comprising:

a relay valve (202) for controlling a supply of pressurized air from a primary source (II) to at least one brake actuator (112*a*, 112*b*);

a first valve sub-unit (204) configured to be electronically actuated, wherein the first valve sub-unit (204) is configured to receive a primary control pressure from the primary source (II) intended for opening the relay valve (202); and a second valve unit (206) configured to at least receive a secondary control pressure from a secondary source ('BST') and at least part of the primary control pressure from the primary source (II) and to transmit either the primary control pressure or the secondary control pressure to the relay valve (202), wherein, when the secondary control pressure is transmitted to the relay valve (202), the primary control pressure from the primary source (II) is disconnected, and when the primary control pressure is transmitted to the relay valve (202), the secondary control pressure from the secondary source (BST) is disconnected, wherein the second valve unit (206) is a mechanically operable valve, in form of a pneumatically controlled valve (206D, 206A, 206B, 206C) having a valve casing (304), the valve casing (304) comprising:

a pressurized guiding sleeve (304.4) defining a valve chamber (305) that axially guides a pressure pickup piston or spool (320) adapted for pneumatic actuation thereof, and a coil casing (304.5) defining a coil chamber (306) adjacent to the pressurized guiding sleeve (304.4), wherein the coil casing includes an open space that is radially adjacent and outside of the guiding sleeve, wherein the open space is sized and configured to extend around the guiding sleeve, wherein the valve chamber (305) is free of a spring (321) and the open space of the coil chamber (306) is free of a coil and free of a solenoid (311), such that the spool (320) is actuable pneumatically only, wherein the spool (320) is subject to a pneumatic force only due to pneumatic pressure in the valve chamber (305);

wherein the pneumatically controlled valve (206A, 206B, 206C) is a 3/2-directional valve, wherein the 3/2-directional valve switches between a first and a second state when receiving a first and/or second switch-control pressure (P1, P2) derived from the primary and/or secondary control pressure (Pc1, Pc2), wherein the 3/2-directional valve, in the second state transmits the secondary control pressure to the relay valve (202) and in the first state transmits the primary control pressure to the relay valve (202).

20. A brake pressure modulator (110, 110*a*, 110*b*, 110*c*, 106), comprising:

a relay valve (202) for controlling a supply of pressurized air from a primary source (II) to at least one brake actuator (112*a*, 112*b*);

a first valve sub-unit (204) configured to be electronically actuated, wherein the first valve sub-unit (204) is configured to receive a primary control pressure from the primary source (II) intended for opening the relay valve (202); and a second valve unit (206) configured to at least receive a secondary control pressure from a secondary source ('BST') and at least part of the primary control pressure from the primary source (II) and to transmit either the primary control pressure or the secondary control pressure to the relay valve (202), wherein, when the secondary control pressure is transmitted to the relay valve (202), the primary control pressure from the primary source (II) is disconnected, and when the primary control pressure is transmitted to the relay valve (202), the secondary control pressure from the secondary source (BST) is disconnected, wherein the second valve unit (206) is a mechanically operable valve, in form of a pneumatically controlled valve (206D, 206A, 206B, 206C) having a valve casing (304), the valve casing (304) comprising:

a pressurized guiding sleeve (304.4) having a guiding sleeve wall defining a valve chamber (305) that axially guides a pressure pickup piston or spool (320) adapted for pneumatic actuation thereof, and a coil casing (304.5) defining a coil chamber (306) adjacent to the pressurized guiding sleeve (304.4), wherein the coil chamber includes an open space that is radially adjacent and outside of the guiding sleeve wall, wherein the open space the coil casing is sized and configured to extend around the guiding sleeve wall, wherein the valve chamber (305) is free of a spring (321) and the open space of the coil chamber (306) is free of a coil and free of a solenoid (311), such that the spool (320) is actuable pneumatically only, wherein the spool (320) is subject to a pneumatic force only due to pneumatic pressure in the valve chamber (305);

wherein the relay valve (202), the first valve sub-unit (204), and the second valve unit (206) are encompassed within a single cast body of the brake pressure modulator (110,106);

wherein the guiding sleeve (304.4) and the guiding sleeve wall are axially fixed relative to each other, wherein the pressure pickup piston or spool (320) slidably moves within the guiding sleeve wall.

* * * * *